(12) United States Patent
Laksono et al.

(10) Patent No.: US 8,842,879 B2
(45) Date of Patent: *Sep. 23, 2014

(54) VIDEO PROCESSING DEVICE FOR EMBEDDING TIME-CODED METADATA AND METHODS FOR USE THEREWITH

(75) Inventors: Indra Laksono, Richmond Hill (CA); John Pomeroy, Markham (CA); Sally Jean Daub, Toronto (CA)

(73) Assignee: VIXS Systems, Inc, Toronto, Ontario (CA)

( * ) Notice: Subject to any disclaimer, the term of this patent is extended or adjusted under 35 U.S.C. 154(b) by 42 days.

This patent is subject to a terminal disclaimer.

(21) Appl. No.: 13/297,471

(22) Filed: Nov. 16, 2011

(65) Prior Publication Data
US 2013/0094698 A1    Apr. 18, 2013

Related U.S. Application Data

(60) Provisional application No. 61/546,405, filed on Oct. 12, 2011.

(51) Int. Cl.
*G06K 9/00* (2006.01)
*H04N 21/45* (2011.01)
*H04N 21/84* (2011.01)
*H04N 21/858* (2011.01)
*H04N 21/485* (2011.01)
*H04N 19/44* (2014.01)
*H04N 21/854* (2011.01)

(52) U.S. Cl.
CPC ....... *H04N 21/4532* (2013.01); *H04N 21/4524* (2013.01); *H04N 21/84* (2013.01); *H04N 21/8586* (2013.01); *H04N 21/4858* (2013.01); *H04N 19/00533* (2013.01); *H04N 21/854* (2013.01)
USPC .......................................... 382/103

(58) Field of Classification Search
None
See application file for complete search history.

(56) References Cited

U.S. PATENT DOCUMENTS

| | | | |
|---|---|---|---|
| 7,123,816 B2 | 10/2006 | McGrath | |
| 7,536,027 B2 | 5/2009 | Nagao | |
| 7,895,227 B1 * | 2/2011 | Henderson | 707/769 |
| 7,920,713 B2 | 4/2011 | Wells | |
| 7,921,116 B2 * | 4/2011 | Finkelstein et al. | 707/746 |
| 2004/0163033 A1 * | 8/2004 | Wolfe et al. | 715/500 |
| 2005/0033758 A1 | 2/2005 | Baxter | |
| 2005/0244146 A1 | 11/2005 | Tsumagari | |
| 2006/0235869 A1 * | 10/2006 | Nagahashi et al. | 707/102 |
| 2007/0250863 A1 * | 10/2007 | Ferguson | 725/46 |
| 2008/0155602 A1 * | 6/2008 | Collet et al. | 725/46 |
| 2008/0208589 A1 | 8/2008 | Cross | |
| 2008/0222295 A1 * | 9/2008 | Robinson et al. | 709/227 |

(Continued)

FOREIGN PATENT DOCUMENTS

WO    WO2006116394 A2    11/2006

*Primary Examiner* — Tahmina Ansari
(74) *Attorney, Agent, or Firm* — Garlick & Markison; Bruce E. Stuckman

(57) ABSTRACT

A video processing device includes a content analyzer that receives a video signal and generates content recognition data based on the video signal, wherein the content recognition data is associated with at least one timestamp included in the video signal. A metadata search device generates time-coded metadata in response to content recognition data and in accordance with the at least one time stamp. A metadata association device generates a processed video signal from the video signal, wherein the processed video signal includes the time-coded metadata.

16 Claims, 20 Drawing Sheets

(56) References Cited

U.S. PATENT DOCUMENTS

2008/0256448 A1* 10/2008 Bhatt ........................... 715/716
2008/0281689 A1 11/2008 Blinnikka
2009/0055383 A1 2/2009 Zalewski
2009/0094113 A1* 4/2009 Berry et al. .................... 705/14
2009/0150210 A1 6/2009 Athsani

* cited by examiner

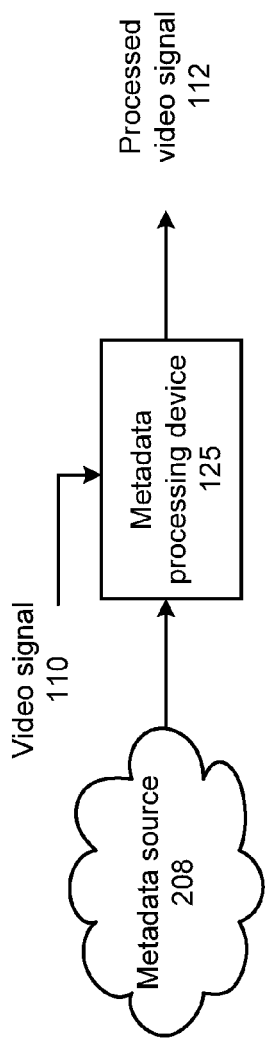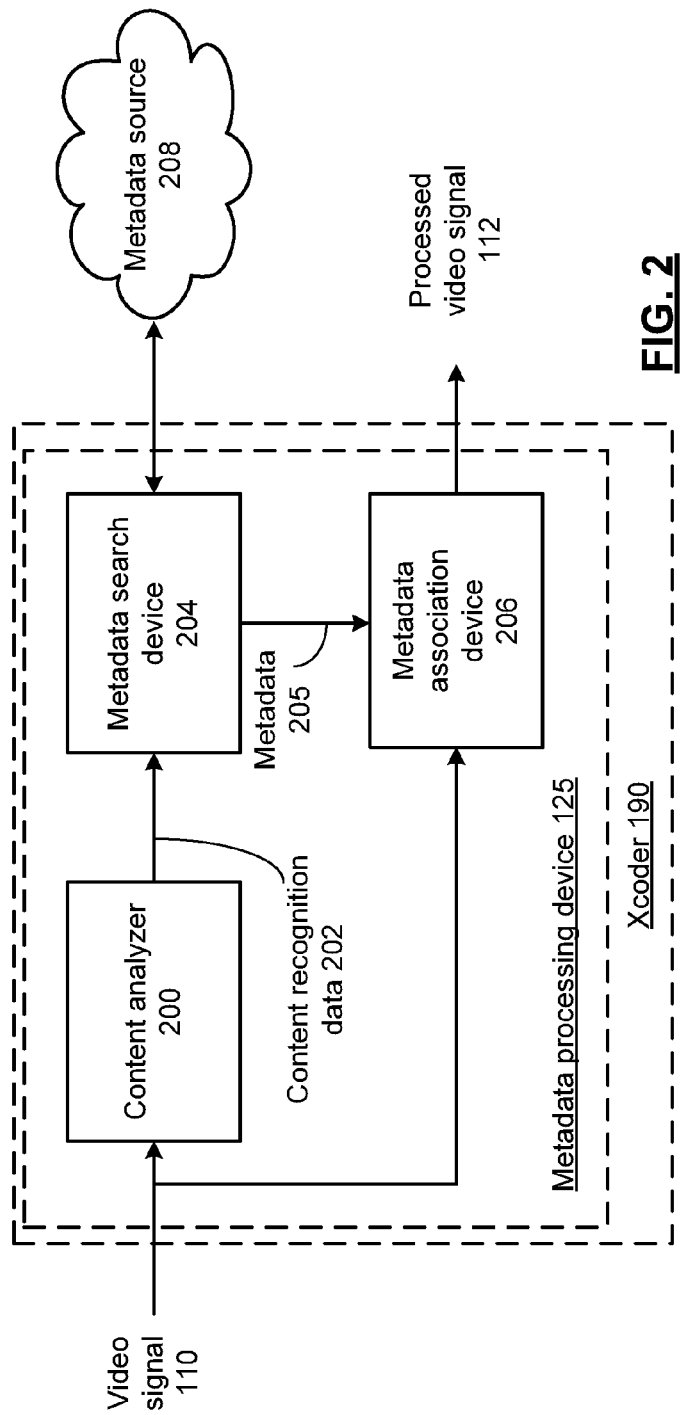

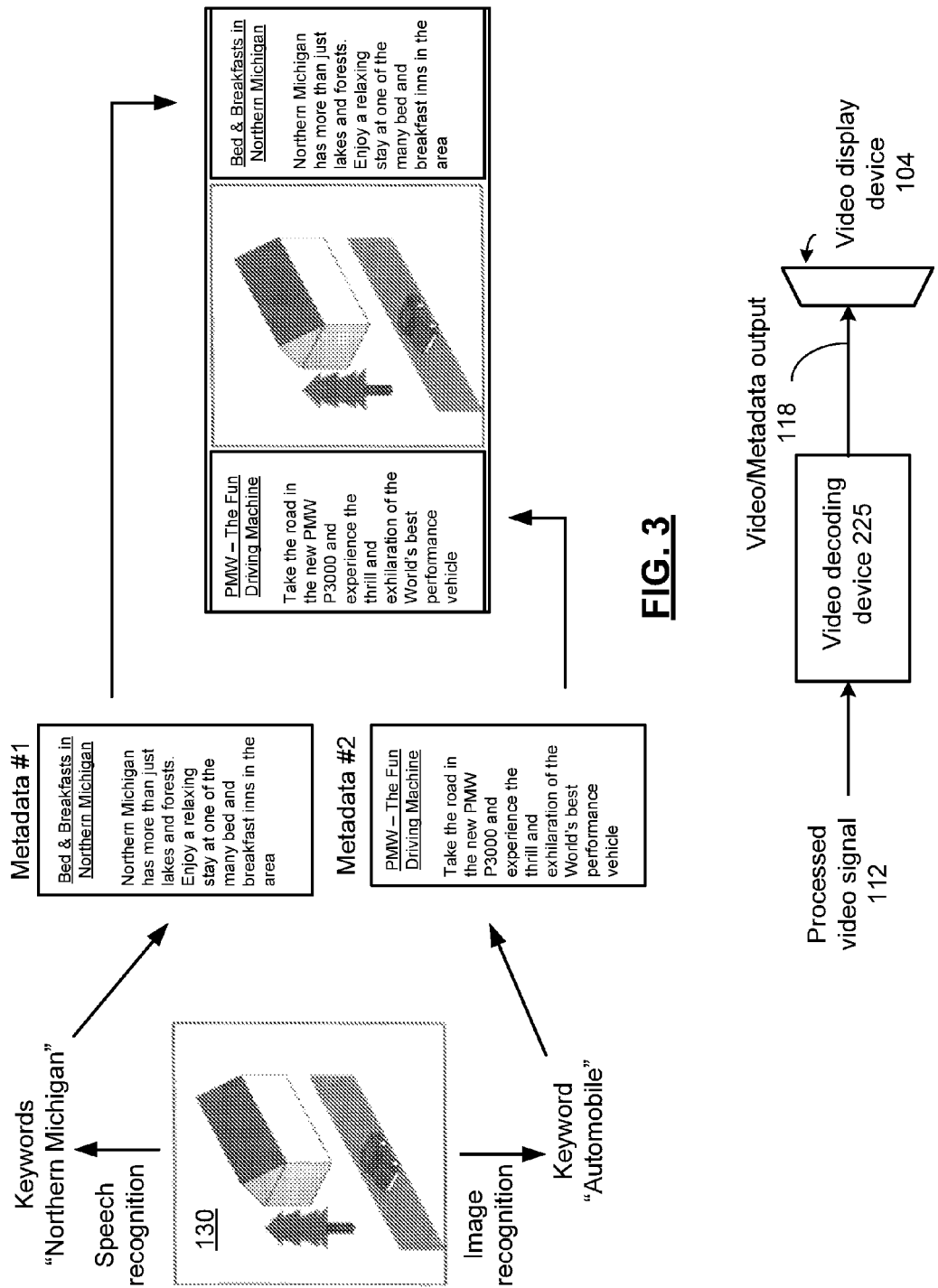

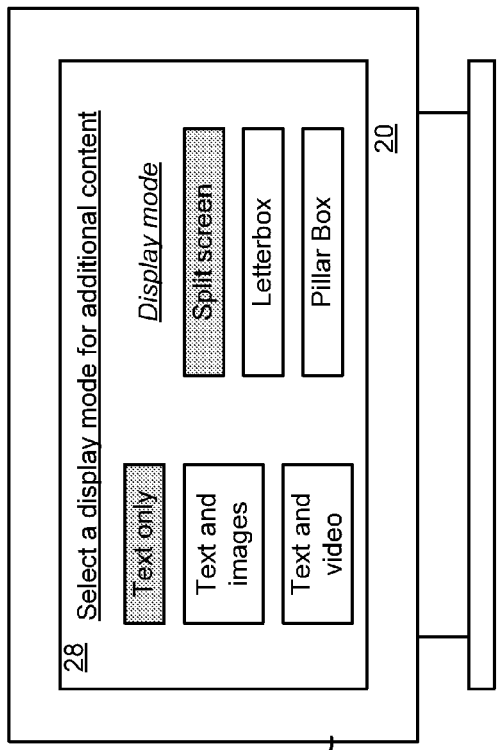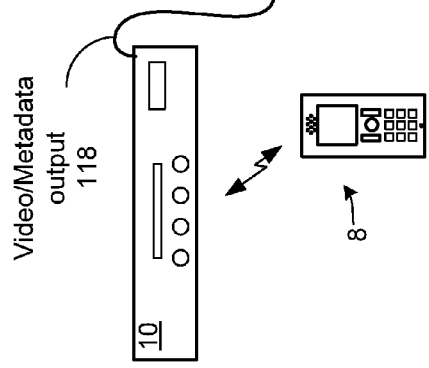
FIG. 9
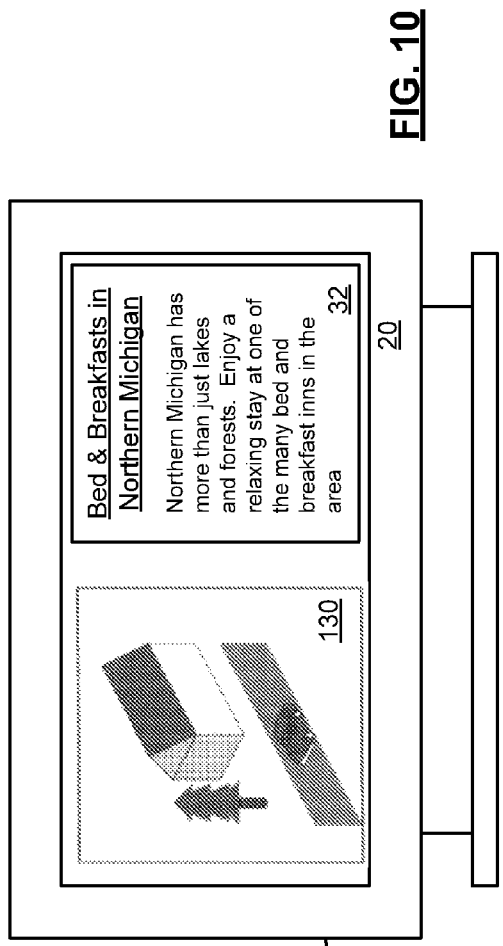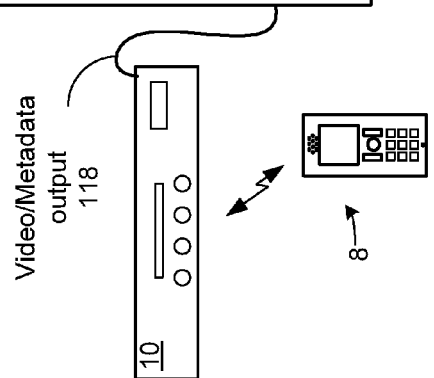
FIG. 10

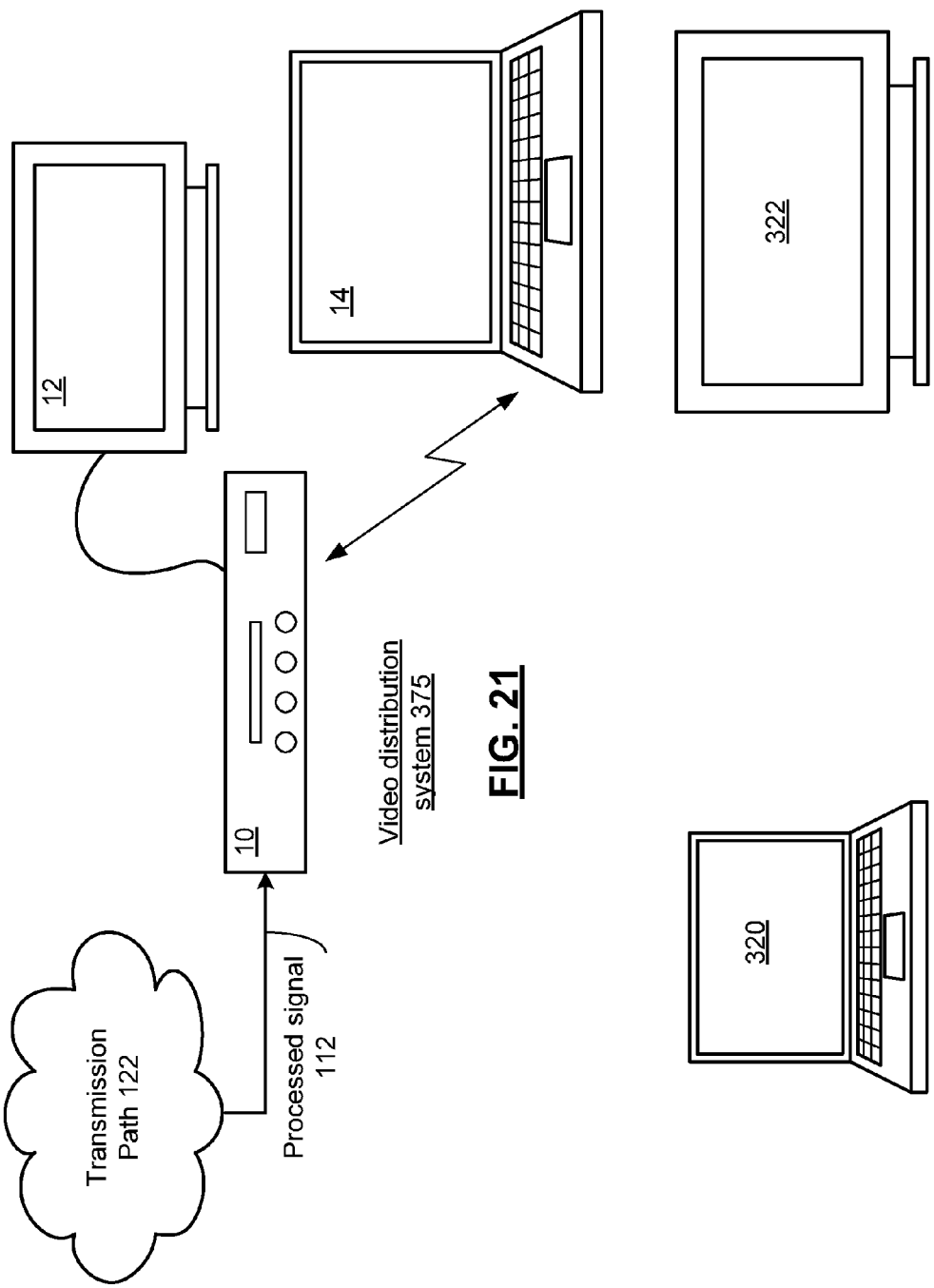

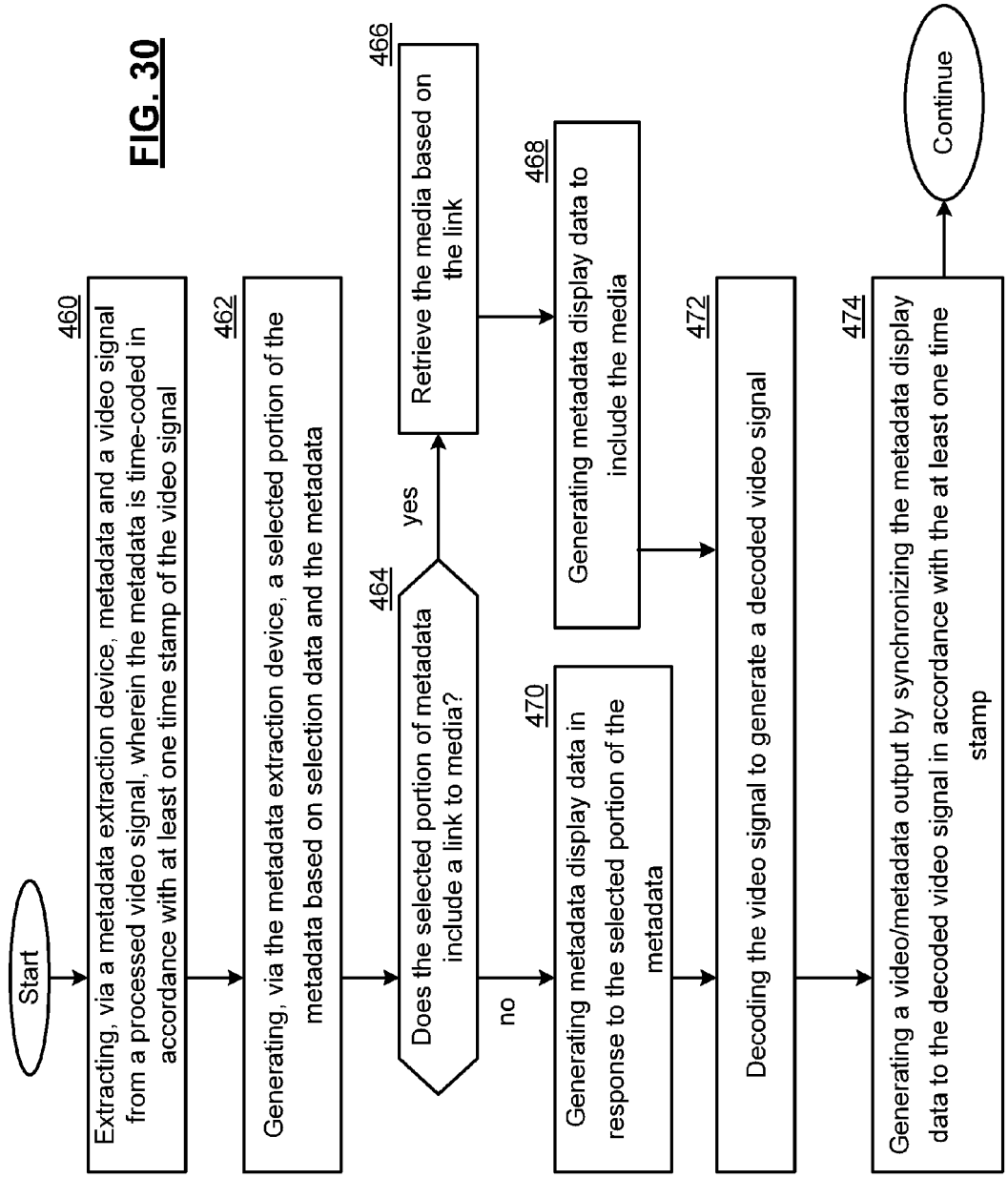

VIDEO PROCESSING DEVICE FOR EMBEDDING TIME-CODED METADATA AND METHODS FOR USE THEREWITH

CROSS REFERENCE TO RELATED PATENTS

The present application claims priority under 35 USC 119 (e) to the provisionally filed application entitled, "VIDEO PROCESSING DEVICE FOR EMBEDDING TIME-CODED METADATA AND METHODS FOR USE THEREWITH," having Ser. No. 61/546,405, filed on Oct. 12, 2011, the contents of which are incorporated herein by reference in its entirety and made part of the present U.S. Utility patent application for all purposes.

TECHNICAL FIELD OF THE INVENTION

The present invention relates to the processing and display of video signals.

DESCRIPTION OF RELATED ART

Broadcast television, cable television and direct broadcast satellite networks are each mature technologies for providing video content to end users. In today's world of broadband Internet connections however, users have a far greater choice as to the source of such content. IP television services are available in most parts of the United States that provide an additional conduit for broadcast video programming. In addition, many web services offer streaming services for movies, live sporting events and other video content.

With the proliferation of such sources of video content, users are faced with an ever expanding array of content and services. Consumption of media is evolving rapidly to the point where the dividing lines start to blur and continuing integration will proceed along multitude of pathways. However, the fundamental presentation of video programming has changed very little. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 1 presents a block diagram representation of a video system in accordance with an embodiment of the present invention.

FIG. 2 presents a block diagram representation of a metadata processing device 125 in accordance with an embodiment of the present invention.

FIG. 3 presents a block diagram representation of a video system in accordance with an embodiment of the present invention.

FIG. 4 presents a pictorial process flow representation in accordance with an embodiment of the present invention.

FIG. 9 presents a block diagram representation of a screen display of a video display device 20 in accordance with an embodiment of the present invention.

FIG. 10 presents a block diagram representation of a screen display of a video display device 20 in accordance with an embodiment of the present invention.

FIG. 21 presents a block diagram representation of a video distribution system 375 in accordance with an embodiment of the present invention.

FIG. 22 presents a block diagram representation of a personal computer 320 in accordance with an embodiment of the present invention.

FIG. 23 presents a block diagram representation of a video display device 322 in accordance with an embodiment of the present invention.

FIG. 30 presents a flow diagram representation of a method in accordance with an embodiment of the present invention.

Figure 5:
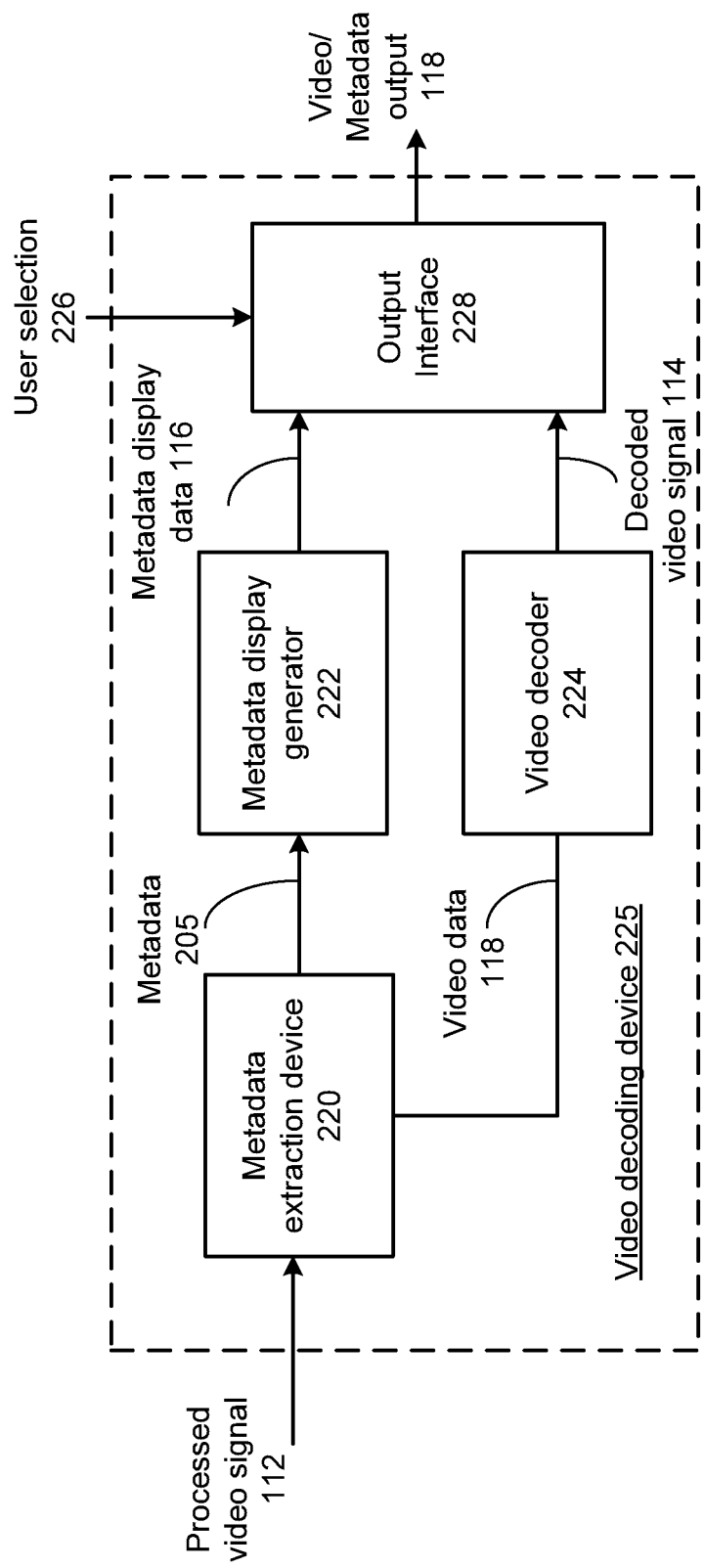
FIG. 5 presents a block diagram representation of a video decoding device 225 in accordance with an embodiment of the present invention.

DETAILED DESCRIPTION OF THE INVENTION INCLUDING THE PRESENTLY PREFERRED EMBODIMENTS

Media such as movies, music, TV shows, sports, user-generated video can come from many sources. Examples of media sources include satellite, cable, websites, proprietary communication lines and a user's own devices and local storage. While media flow continues to expand to different sources and different devices, metadata, e.g. information, relevant to that media, is also available from different sources such as websites, and online encyclopaedias, online or local private databases, and other sources.

FIG. 1 presents a block diagram representation of a video system in accordance with an embodiment of the present invention. In particular, a metadata processing device 125 is presented that operates to embed metadata from a metadata source 208 in a video signal 110 to form a processed video signal 112. Metadata processing device 125 has the ability to integrate relevant metadata to content being processed to create a seamless experience that allows a user to enhance their content consumption experience. In addition to standard information regarding the content of video signal, such as title, type of programming, general information, creation time, etc, metadata processing device 125 can use video, image and audio processing tools to embed new time-coded metadata within the content.

In an embodiment of the present invention, the metadata processing device 125 is part of a broadcast video distribution network, such as a cable television network, a direct broadcast satellite network, an over the air television network, an IP television service delivered via a broadband internet connection, a video on demand service, a web-based video service or other video distribution network. Video signals 110 are combined with metadata from one or more metadata sources as part of the retrieval, distribution and/or transcoding of these video signals to form processed video signals 112 that are sent to a user for viewing. The metadata processing device 125 can be included in a network node, headend, or other network device of a public or private video distribution network or part of an international, national or local cloud that distributes video as video data as part of a more general local area or wide area data network.

Video signal 110 can include a digital video signal complying with a digital video codec standard such as H.264, MPEG-4 Part 10 Advanced Video Coding (AVC) including an SVC signal, an encoded stereoscopic video signal having a base layer that includes a 2D compatible base layer and an enhancement layer generated by processing in accordance with an MVC extension of MPEG-4 AVC, or another digital format such as a Motion Picture Experts Group (MPEG) format (such as MPEG1, MPEG2 or MPEG4), Quicktime format, Real Media format, Windows Media Video (WMV) or Audio Video Interleave (AVI), video coding one (VC-1), VP8, or other digital video format. In addition to the inclusion of metadata, processed video signal 112 can include a digital video signal in any of the formats discussed above in conjunction with video signal 110. In particular, processed video signal 112 can be in the same digital video format as video signal 110. As discussed above, in the alternative, processed video signal 112 can be optionally transcoded into a different compression format, different video resolution, a different frame rate, a different scale, a different data rate or otherwise into a different format, with or without optional scrambling or encryption.

Metadata processing device 125 can mine alternative information sources for new information pertaining to a video signal 110. Such new information could be a link to new content or actual new content itself. For example, metadata processing device 125 can include a speech recognition module that generates a time-coded dialog text of the audio associated with the video signal 110 and perform Internet searches for historical quotes, images, background information and other potentially relevant information. Once new information/metadata is identified it can be filtered by relevance based on suitability criteria and inserted in a time-coded fashion to the original or transcoded content. This new content now contains original content but with relevant metadata that allows the end user, for example, to understand a video in new ways.

The metadata can be processed by the end user external to the video, but to be compatible with legacy products, the metadata can be watermarked and embedded in time-coded locations relevant to the content so that particular content can also be recompressed with new pictorial or audible data into a single stream that is viewable by such legacy devices as a single movie the way they understand them today. Multiple versions of content from original to heavily enhanced can be created and made available to user to choose which version to view. On more advanced viewing devices, the experience can be made to be more enhanced where metadata can be selectively rendered or viewed at user discretion on the final device. This solution can work for broadcasters, for internet clouds, even for personal clouds in the home when there are personal data that is not meant for public. For example, family vacation pictures in New Zealand could be added to a viewing a motion picture set in this country, if the user feels it will impress his guest.

Several examples and many optional functions and features including details regarding the inclusion of metadata in a processed video signal and the decoding and presentation of such a processed video signal to a user are presented in conjunction with FIGS. 2-30.

FIG. 2 presents a block diagram representation of a metadata processing device 125 in accordance with an embodiment of the present invention. In particular, metadata processing device 125 includes a content analyzer 200, a metadata search device 204, and a metadata association device 206 that is optionally part of a transcoder 190.

In operation, content analyzer 200 receives a video signal 110 and generates content recognition data 202 based on the video signal 110. The content recognition data 202 is associated with at least one timestamp included in the video signal 110. Metadata search device 204 generates metadata 205 in response to the content recognition data 202 that is time-coded in accordance with the at least one time stamp of the video signal 110. Metadata association device 206 generates processed video signal 112 from either the video signal 110 or a transcoded version of video signal 110 generated by optional transcoder 190. In particular, the processed video signal 112 includes the time-coded metadata 205 along with the original or transcoded video signal 110.

The content analyzer 200, metadata search device 204, metadata association device 206 and optional transcoder 190 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when content analyzer 200, metadata search device 204, metadata association device 206 and optional transcoder 190 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Content analyzer 200 operates to generate content recognition data 202 in a form or format that can be used by metadata search device 204 to search one or more metadata sources 208 for metadata 205 to be embedded in the video. In particular, the content analyzer 200 identifies content that occurs at certain points in the video signal 110 based on time stamps included in the video so that metadata associated with that content can be synchronized with the video for presentation to the user.

In an embodiment of the present invention, the content analyzer 200 includes a pattern recognition module that uses speech recognition and or image recognition to generate the content recognition data 202 based on a recognition of speech in audio information included in the video signal 110 and/or based on image recognition of the particular images included in the video signal 110. Consider an example where a segment of video at a particular time stamp or range of time stamps shows an automobile driving along a country road. The audio portion of the video discusses the beauty of the Northern Michigan at that time of the year. The pattern recognition module of content analyzer 200 analyzes the images included in this video segment and recognizes a particular object, an automobile. In addition, the pattern recognition module of content analyzer 200 analyzes the audio included in this video segment and recognizes a particular place, Northern Michigan. In response, the content analyzer 200 generates content recognition data 202 that indicates the keywords, "automobile" and "Northern Michigan" associated with the timestamp or range of time stamps that are associated with this particular portion of video signal 110.

While the content analyzer 200 is described above in speech and image recognition, other portions of video signal 110 can be used to generate metadata associated with the video content. In particular, content analyzer 200 can identify content recognition data 202 such as key words or other indicators based on closed captioning text included in the video signal 110, character recognition of images in the video signal 110 and via other identification or recognition routines.

Metadata search device 204 is coupled to one or more metadata sources 208 such as local storage, a local area network or a wide area network such as the Internet. In an embodiment of the present invention, the metadata search device 204 includes a search engine that searches the metadata source or sources along with a content evaluator that evaluates the relevancy of content that was located to identify metadata 205 for inclusion in the processed video signal 112, based on the content recognition data 202. In this fashion, content relating to persons, places, objections, quotes, movies, songs, events, or other items of interest can be identified for inclusion as metadata 205 in processed video 112.

Consider the example discussed above, where a segment of video at a particular time stamp or range of time stamps shows an automobile driving along a country road. The key words "automobile" and "Northern Michigan" indicated by content recognition data 202 are input to a search engine that, for example, locates web content associated with these keywords. The web content is evaluated for relevancy based on, for example its age, image quality, website reviews or other rankings, or other evaluation criteria to determine the particular metadata 205 to be generated. When the metadata search device 204 generates a plurality of search results, it also generates associated relevance data and selects the time-coded metadata 205 based on an analysis of this relevance data. For example, the metadata search device 204 can select the time-coded metadata 205 by comparing the associated relevance data to a relevance threshold, by selecting content with the highest relevance, or by other analysis of the relevance data or other data associated with the identified content, such as media format, file size, etc.

In an embodiment of the present invention, the metadata 205 includes the particular content, the text data, image data, video data and/or audio data or other media data identified by metadata search device 204. In an alternative embodiment, metadata 205 includes links to some or all of the identified content in the form of a file address, network address such as a Universal Resource Locator (URL) or other locator, rather than including all of the identified content itself.

The metadata association device 206 generates the processed video signal 112 by combining the time-coded metadata with the video signal at time-coded locations in accordance with the at least one time stamp. This can be accomplished in several ways.

In one mode of operation where the metadata 205 includes media content, the processed video signal 112 can be presented as a standard video signal where metadata in the form of text, images, video are combined with the video signal 110 or the transcoded video signal 110 in a fashion to be presented in a picture-in-picture, split screen or overlaid on the original video.

For example, the original video programming from video signal 110 can be present in a letterbox or pillar box format with the normally unused letterbox or pillar box areas filled in with media from metadata 205. Likewise, in a picture-in-picture or split screen mode of operation the media content from metadata 205 can be presented in a separate portion of the screen from the video programming from video signal 110. In another example where the metadata is primarily text or simple images, the metadata 205 can be overlaid on the video programming from video signal 110. In each of these examples, the processed video signal 112 can be formatted for decoding and/or direct display on a legacy video device such as a set top box, wireless telephone, personal video player, standard television, monitor or other video display device.

As discussed above, the metadata 205 time-coded based on the time stamps associated with the content recognition data 202. Metadata 205 can include similar time stamps, or ranges of time stamps or other time coding data that are used to align and synchronize the presentation of the metadata 205 with the corresponding portions of the video signal 110. In this fashion, portions of the original video corresponding to the time stamp or range of time stamps that yielded the content recognition data 202, are presented contemporaneously with the metadata 205 identified by metadata search device 204 in response to that particular content recognition data 206. In the mode of operation discussed above where the metadata 205 is directly combined with the video programming from video signal 110, the metadata association module 206 uses the time-coding of metadata 205 to align and synchronize the presentation of the metadata 205 with the corresponding portions of the video signal 110.

In another mode of operation, the metadata association device 206 generates the processed video signal 112 by embedding the time-coded metadata 205 as a watermark on the video signal. In this fashion, the time-coded metadata 205 in the form of media or media links can be watermarked and embedded in time-coded locations relevant to the content so that the video program can also be re-encoded into a single stream. The original video content can be decoded and viewed by legacy devices—however, the watermarking can be extracted and processed to extract either the additional media content or links to additional content that can be viewed with enhanced viewing devices or additional display devices.

It should be noted that other techniques can be used by the metadata association device 206 to combine the content from video signal 110 into the processed video signal 112. In another mode of operation, the content of video signal 110 in the form of video packets can be encapsulated into another protocol that carries the metadata 205. The metadata 205 and video signal 110 can be extracted by a decoding device by unwrapping the outer protocol and passing the video packets to a video coder for separate decoding. Other techniques include interspersing or interleaving the metadata 205 with the video content from video signal 110, transmitting the metadata 205 in a separate layer such as an enhanced layer of an MVC formatted or other multi-layer formatted video, or transmitting the metadata 205 concurrently with the video content of video signal 110 via other time division multiplexing, frequency division multiplexing, code division multiplexing or other multiplexing technique.

It should also be noted that processed video signal 112 can be presented in a variety of other formats. A multiplexed audio/video (AV) signal with digital metadata 205 can be combined in each data packet where the audio, video and metadata are separated digitally. The metadata 205 can rendered and mixed with the audio or mixed with the video or both and then reencoded digitally so the metadata is not separable from the audio or video or both. The AV and metadata can be formatted as separate signals sent out in parallel as distinct signals over distinct paths or the same path. Also, the AV can be sent contiguously while metadata 205 are kept in the metadata processing device 125 (within a local database) for retrieval on demand as required by the final viewing device.

FIG. 3 presents a pictorial process flow representation in accordance with an embodiment of the present invention. In particular, an example process flow is shown in conjunction with one particular mode of operation of metadata processing device 125.

In the example shown, a segment 130 of video 110 at a particular time stamp shows an automobile driving along a country road. The audio portion of the video discusses the beauty of the Northern Michigan at that time of the year. The pattern recognition module of content analyzer 200 analyzes the images included in this video segment and recognizes a particular object, an automobile. In addition, the pattern recognition module of content analyzer 200 analyzes the audio included in this video segment and recognizes a particular place, "Northern Michigan". In response, the content analyzer 200 generates content recognition data 202 that indicates the keywords, "automobile" and "Northern Michigan" associated with the timestamp or range of time stamps that are associated with this particular segment 130.

The key words "automobile" and "Northern Michigan" indicated by content recognition data 202 are input via metadata search device 204 to a search engine that, for example, locates web content associated with these keywords. The web content is evaluated for relevancy based on, for example its age, image quality, website reviews or other rankings, or other suitability criteria to determine the particular metadata 205 to be generated. When the metadata search device 204 generates a plurality of search results, it also generates associated relevance data and selects the time-coded metadata 205 based on an analysis of this relevance data. In the example shown, Metadata #1 is a portion of hypertext generated in response to the keywords "Northern Michigan" that discusses bed and breakfast inns. Metadata #2 is a portion of hypertext generated in response to the keyword "automobile" that includes an advertisement for a particular model of automobile, the P3000.

As shown in a rendering of the processed video signal 112, segment 130 of video 110 is presented in a pillar box format with the pillar box areas filled in with media from metadata#1 and metadata#2. As discussed in conjunction with FIG. 2, in this mode of operation the processed video signal 112 is formatted for decoding and/or direct display on a legacy video device such as a set top box, wireless telephone, personal video player, standard television, monitor or other video display device.

FIG. 4 presents a block diagram representation of a video system in accordance with an embodiment of the present invention. In particular a system is shown that includes a video decoding device 225 and a video display device 104. In this embodiment, the processed video signal 112 is formatted as a standard video signal where metadata 205 in the form of text, images, video are combined with the video signal 110 or the transcoded video signal 110 in a fashion to be presented in a picture-in-picture, split screen or overlaid on the original video. In particular, the processed video signal 112 can be a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, the processed video signal 112 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

In an embodiment of the present invention, the video decoding device 225 includes television receiver, cable television receiver, satellite broadcast receiver, broadband modem, 3G or 4G transceiver or other information receiver or transceiver that is capable of receiving a processed video signal 112 and generating a video/metadata output 118 in response thereto. Video decoding device 225 includes a video decoder to decode or transcode the video signal for storage, editing, and/or playback in a format corresponding to video display device 104. The video decoding device 225 can be implemented via a standard set-top box and a video display device 104, such as a standard television, monitor, or other video display device. In this implementation, the video/metadata output 118 is an S-video signal, component video signal, composite video signal, HDMI signal or other video signal output compatible with video display device 104. While shown as separate devices, the standard format of processed video signal 112 also lends itself to implementations where the video decoding device 225 and video display device 104 are included in a single device such as a television, computer, tablet, wireless phone or other video display device.

As discussed in conjunction with FIG. 2, processed video signal 112 can include the original video programming from video signal 110 in a letterbox or pillar box format with the normally unused letterbox or pillar box areas filled in with media from metadata 205. Likewise, in a picture-in-picture or split screen mode of operation, the media content from the metadata can be presented in a separate portion of the screen from the video programming from video signal 110. In another example where the metadata is primarily text or simple images, the metadata can be overlaid on the video programming from video signal 110. In each of these examples, the processed video signal 112 can be formatted for decoding and/or direct display via one or more legacy video devices such as a set top box, wireless telephone, personal video player, standard television, monitor or other video display device.

FIG. 5 presents a block diagram representation of a video decoding device 225 in accordance with an embodiment of the present invention. In particular, a video decoding device 225 is presented for use in circumstances where processed video signal 112 includes embedded metadata that requires extraction prior to being displayed. For example, the processed video signal 112 can include time-coded metadata 205 embedded as a watermark on the video signal, included as an additional layer, carried via a protocol that carries the original or transcoded video signal in an encapsulated fashion, or that is multiplexed with the original or transcoded video signal. In this implementation, the metadata 205 in the form of additional media content, such as text, images, audio or video, can be extracted and processed for viewing on either a standard display device or on a separate device from the display device used for displaying the original video content. In this implementation, video decoding device 225 includes a metadata extraction device 220 that extracts metadata 205 and a video signal 118 from the processed video signal 112.

Where the metadata 205 is carried via a watermark, the metadata extraction device 220 processes the processed video signal 112 to read the watermark and to reconstruct the metadata 205 from the watermark as read. The metadata extraction device 220 optionally removes the watermark from the processed video signal 112 to generate the video data 118 or otherwise passes the processed video signal 112 as the video data 118 when removal of the watermark is not necessary for accurate video decoding.

In circumstances where the metadata 205 is carried via a protocol that wraps the original or transcoded video content, the metadata 205 and video signal 118 can be extracted by a decoding device by unwrapping the outer protocol and passing the video packets to a video coder for separate decoding. In other metadata transport mechanisms, the metadata extraction device operates via a deinterleaver, demultiplexer or layered video decoder to separate the time-coded metadata 205 form the video data 118.

A metadata display generator 222 generates metadata display data 116 in response to the metadata 205. In particular, the metadata display generator 222 processes the metadata display data 116 for display as the text, images, video, audio or other media according to the format of the metadata 205 itself. Video decoder 224 decodes the video signal 118 to generate a decoded video signal 114. An output interface 228 generates a video/metadata output 118 by synchronizing the metadata display data 116 to the decoded video signal 114 in accordance with the time stamps in the decoded video signal and the time-coding of the extracted metadata 205.

As shown, the output interface 228 responds to user selections 226 to set the format of the video/metadata output 118. In response to a first user selection, the output interface 228 combines the metadata display data 116 and the decoded video signal 114 for display of the video/metadata output 118 on a single video display device. In this embodiment, the video/metadata output 118 is formatted as a standard video signal where metadata display data 116 in the form of text, images or video are combined with the decoded video signal 114 in a fashion to be presented in a picture-in-picture, split screen or overlaid on the original video, as selected in response to the user selection 226. In particular, the video/metadata output 118 can formatted as an S-video signal, component video signal, composite video signal, HDMI signal or other video signal output compatible with a video display device, such as video display device 104.

In another mode of operation, the output interface 228 responds to a second user selection to generate first video/metadata output 118 that formats the decoded video signal 114 for display on the first video display device such as a video display device 104 and a separate second video/metadata output 118 that includes the metadata display data 116 for display on a second display device, such as wireless telephone, a tablet personal computer or other personal computer or other display. In this fashion, a user can view the video content of decoded video signal 114 while contemporaneously viewing the metadata display of the time-coded metadata, synchronized with the display of the decoded video signal on a second device.

In a further mode of operation, the user selection 226 includes configuration data to configure the output interface 228 to generate the video/metadata output 118 to include and exclude selected portions of the metadata display data 116 based on a user selection 226. For example, the user selection 226 can specify metadata display data 116 to be included or excluded based on the format of the metadata, such as text, image, audio, video, etc. In this fashion, a user can select the display of text only, text and images, video only, audio only or any other combination thereof. In addition, the user can provide selection data in the form of user selection 226 to select the format of the video/metadata output 118 for a plurality of devices including the digital format including the frame rate, scale and resolution for output of the decoded video 114, the type of device, format and other/or parameters for providing the metadata display data 116 to one or more separate devices via one or more separate video/metadata outputs 118.

Figure 6:
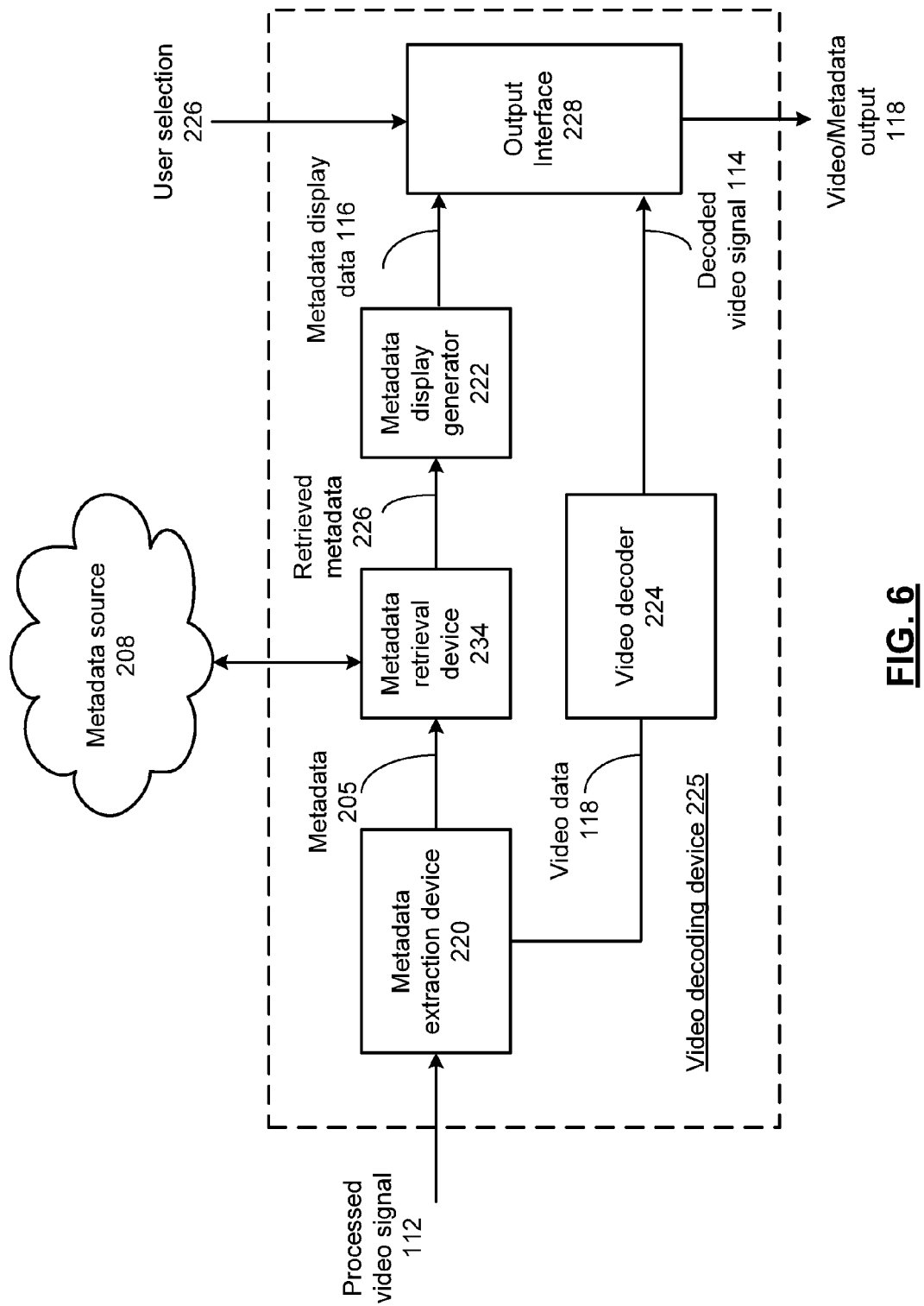
FIG. 6 presents a block diagram representation of a video decoding device 225 in accordance with an embodiment of the present invention.

FIG. 6 presents a block diagram representation of a video decoding device 225 in accordance with an embodiment of the present invention. In particular, a video decoding device 225 is presented that includes many similar elements described in conjunction with FIG. 5 that are referred to by common reference numerals. Like the video decoding device of FIG. 5, this device is for use in circumstances where processed video signal 112 includes embedded metadata that requires extraction prior to being displayed. For example, the processed video signal 112 can include time-coded metadata 205 embedded as a watermark on the video signal, included as an additional layer, carried via a protocol that carries the original or transcoded video signal in an encapsulated fashion, or that is multiplexed with the original or transcoded video signal.

In this implementation however, the metadata 205 is in the form of links to additional content. The links are extracted from the processed video signal 112 via metadata extraction device 220 and the additional content is retrieved and processed for viewing on either a standard display device or on a separate device from the display device used for displaying the original video content. In particular, a metadata retrieval device 224 receives metadata 205 that includes one or more links to additional media, such as text, images, audio and video. Metadata retrieval device 224 includes a browser, file retrieval utility or other hardware or software to generate retrieved metadata 226 by retrieving the media corresponding to these links from one or more metadata sources 208. In this embodiment, the metadata display generator 222 generates the metadata display data 116 to include the media.

The metadata extraction device 220, metadata display generator 222, video decoder 224, output interface 228 and metadata retrieval device 234 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when metadata extraction device 220, metadata display generator 222, video decoder 224, output interface 228 and metadata retrieval device 234 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 7:
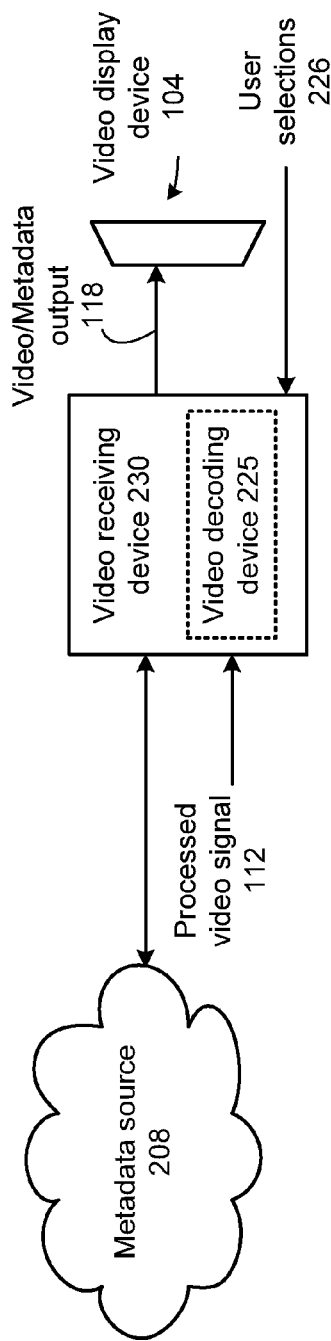
FIG. 7 presents a block diagram representation of a video system in accordance with an embodiment of the present invention.

FIG. 7 presents a block diagram representation of a video system in accordance with an embodiment of the present invention. In particular a system is shown that includes a video decoding device 225 as part of a video receiving device 230 and a video display device 104. In this embodiment, the processed video signal 112 is not formatted as a standard video signal and metadata 205 in the form of text, images, video are combined with the video signal 110 or the transcoded video signal 110 and must be extracted via video decoding device 225 as described in conjunction with either FIG. 5 or 6.

The processed video signal 112 can be a broadcast video signal, such as a television signal, high definition television signal, enhanced definition television signal or other broadcast video signal that includes embedded metadata 205 and that has been transmitted over a wireless medium, either directly or through one or more satellites or other relay stations or through a cable network, optical network or other transmission network. In addition, the processed video signal 112 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

In an embodiment of the present invention, the video receiving device 230 includes a television receiver, cable television receiver, satellite broadcast receiver, broadband modem, 3G or 4G transceiver or other information receiver or transceiver that is capable of receiving a processed video signal 112 and generating a video/metadata output 118 in response thereto. Video receiving device 230 can be implemented via a set-top box or digital video recorder. In this implementation, the video/metadata output 118 is an S-video signal, component video signal, composite video signal, HDMI signal or other video signal output compatible with video display device 104. While shown as separate devices, the video receiving device 230 and video display device 104 can be in a single device such as a television, computer, tablet, wireless phone or other video display device. Video receiving device further includes a broadband network interface such as a cable modem, 3G or 4G modem, a network card, a digital subscriber line, a wireless network connection or other broadband network interface to optionally access one or more metadata sources 208 via the Internet, via a local area network connection or via another connection, either wired or wireless.

User selections 226 generated by a remote control device of the video receiving device 230 or via other user interface of the video receiving device 230 are sent to the video decoding device 225 to control the output selections as presented in conjunction with FIGS. 5-6. In an embodiment of the present invention, the video receiving device 230 includes a video signal generator for generating one or more menus, pop-up messages or other graphics and text for generating a graphical user interface that is displayed on the video display device 104 and that prompts the user to enter user selections 226. The user selections 226 can include default selections, user preferences or specific selections relating to the display of metadata display data 116, prior to receiving metadata 205 or as metadata 205 is received. Further examples are presented in conjunction with FIGS. 8-10 that follow.

Figure 8:
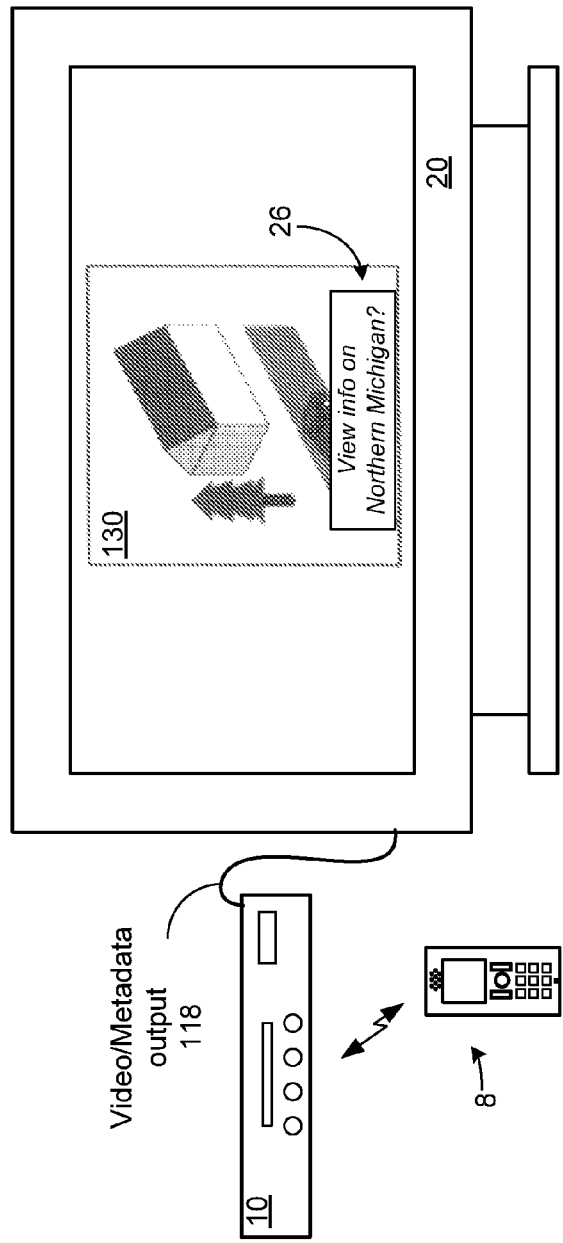
FIG. 8 presents a block diagram representation of a screen display of a video display device 20 in accordance with an embodiment of the present invention.

FIG. 8 presents a block diagram representation of a screen display of a video display device 20 in accordance with an embodiment of the present invention. In this example, video display device 20 operates as video display device 104 described in conjunction with FIG. 7. In particular, video display device 20 is coupled to a video receiving device 10 that operates as video receiving device 230. In particular video receiving device 10 receives a processed video signal 112 that includes a video signal 110. In this example, the segment 130 of video 110 at a particular time stamp shows an automobile driving along a country road. The audio portion of the video discusses the beauty of the Northern Michigan at that time of the year. Metadata 205 embedded in the processed video signal 112 includes additional information relating to the particular place, "Northern Michigan".

The video decoding device 225 of video receiving device 10 extracts this time coded meta data 205 during the processing of the corresponding segment 130 and generates video/metadata output 118 that includes a pop-up 26 that is overlaid on the display of video segment 130 that indicates that additional information is available and that the additional information relates to Northern Michigan, the keywords included in metadata 205. In an embodiment of the present invention, the pop-up 26 is presented for a limited duration, such as 10 seconds or some longer or shorter period. If the user responds by, for example, pressing a "yes" or "accept" button on a remote control device 8 associated with video receiving device 10 in response to the pop-up, this user selection is used by video processing device 225 to either modify the video/metadata output 118 to include the display of the corresponding metadata display data or to gather further information relating to the options for display of the metadata.

FIG. 9 presents a block diagram representation of a screen display of a video display device 20 in accordance with an embodiment of the present invention. In particular a screen display 28 of video display device 20 is shown in conjunction with a follow-on to the example presented in conjunction with FIG. 8. In particular, in response to a user requesting to display additional information in response to the pop-up 26, the video receiving device modifies the video/metadata output 118 to display a menu in display screen 28 to prompt the user to select the format of the metadata to be displayed, e.g. text only, text and images, or text and video. In addition, the user is given the option of selecting the particular display mode, e.g. split screen, letterbox or pillar box.

As shown in the example, the user selects "text only" and "split screen" via interaction with the video receiving device 10, via remote control device 8. In response, the video receiving device generates user selections, such as user selections 226 that are used to modify the video/metadata output 118 in response to these selections. FIG. 10 presents a block diagram representation of a screen display of a video display device 20 in accordance with an embodiment of the present invention that presents the video segment 130 in conjunction in a split screen mode in conjunction with metadata display data as shown in screen portion 32.

While the example presented in conjunction with FIGS. 8-10 contemplates the selection of the display of metadata, the type of metadata to be displayed and the selection of the display mode in real-time, i.e. at the time the metadata is received, it should be noted that whether or not to display metadata at all, the type or types of metadata to be displayed, the display mode and possibly further display options could be selected by the user and stored as preferences, default settings during set-up of the video receiving device 10 or otherwise prior to the display of a particular video segment 130 that has associated metadata.

Figure 11:
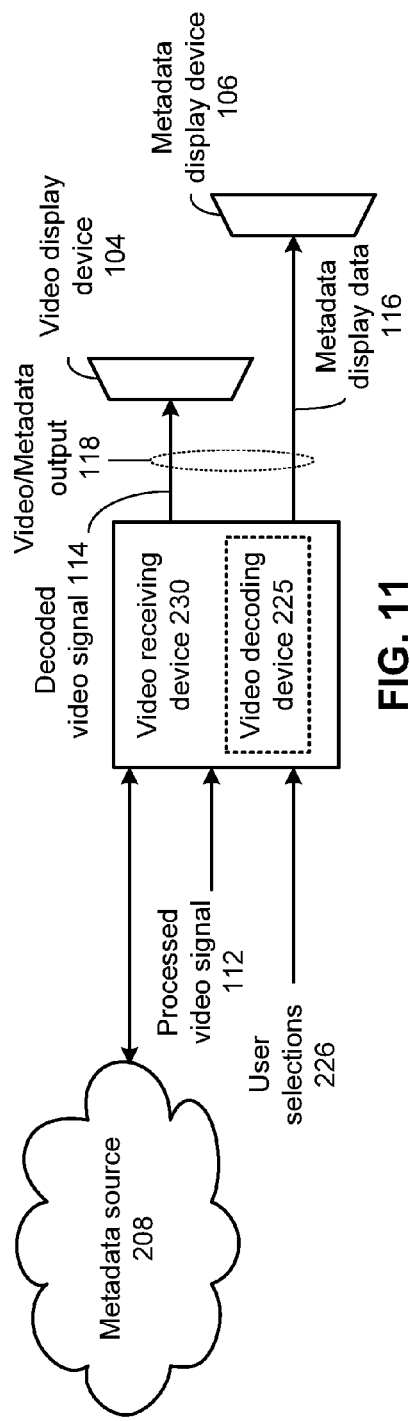
FIG. 11 presents a block diagram representation of a video system in accordance with an embodiment of the present invention.

FIG. 11 presents a block diagram representation of a video system in accordance with an embodiment of the present invention. In particular, a video receiving device is presented as described in conjunction with FIG. 8. In this example however, as discussed in conjunction with FIG. 5, the video decoding device 225 generates first video/metadata output 118 that formats the decoded video signal 114 for display on the first video display device such as a video display device 104 and a separate second video/metadata output 118 that includes the metadata display data 116 for display on a metadata display device 106, such as a wireless telephone, a tablet personal computer or other personal computer or other display. In this fashion, a user can view the video content of decoded video signal 114 while contemporaneously viewing the metadata display of the time-coded metadata, synchronized with the display of the decoded video signal on metadata display device 106.

Figure 12:
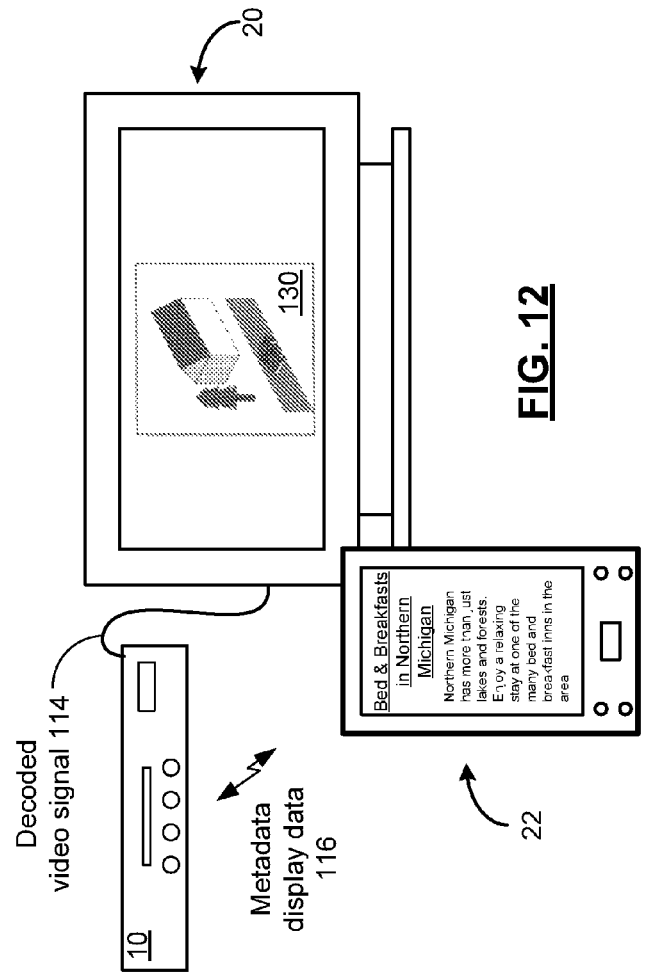
FIG. 12 presents a block diagram representation of a video display device 20 and display device 22 in accordance with an embodiment of the present invention.

FIG. 12 presents a block diagram representation of a video display device 20 and display device 22 in accordance with an embodiment of the present invention. In particular, video receiving device 10, such as video receiving device 230, receives a processed video signal 112 that includes a video signal 110. In this example, the segment 130 of video 110 at a particular time stamp shows an automobile driving along a country road. The audio portion of the video discusses the beauty of the Northern Michigan at that time of the year. Metadata 205 embedded in the processed video signal 112 includes additional information relating to the particular place, "Northern Michigan".

The video receiving device 10 generates separate video/metadata outputs 118. In particular, video receiving device 10 formats the decoded video signal 114 for display on the video display device 20 and a separate second video/metadata output that includes the metadata display data 116 for display on a tablet personal computer (PC) 22. In particular, video receiving device 10 includes a wireless interface such as a Bluetooth or 802.11 transceiver for communicating wirelessly with the tablet PC, either directly or indirectly, via a personal area network, piconet or wireless local area network connection. In this fashion, a user can view the video content of decoded video signal 114 while contemporaneously viewing the metadata display of the time-coded metadata, synchronized with the display of the decoded video signal on tablet PC 22.

Figure 13:
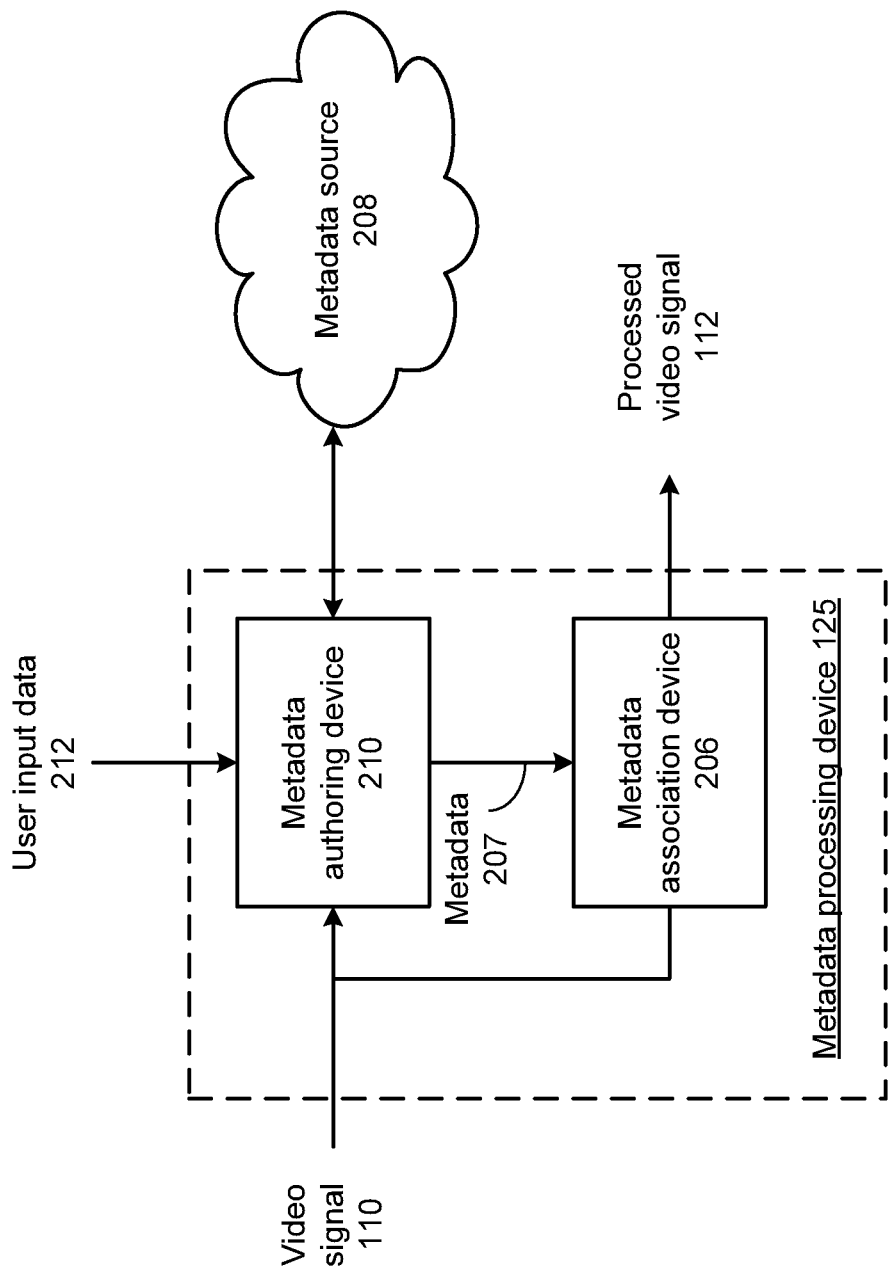
FIG. 13 presents a block diagram representation of a metadata processing device 125 in accordance with another embodiment of the present invention.
Figure 14:
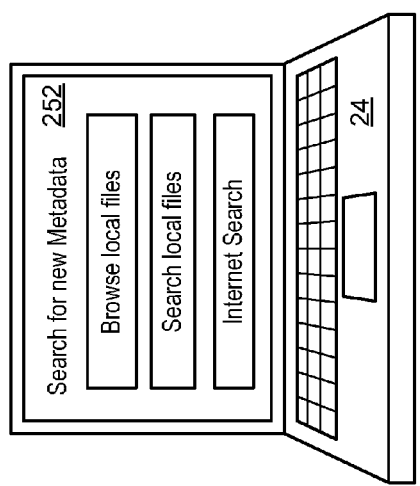
FIG. 14 presents a block diagram representation of a screen display of a personal computer 24 in accordance with an embodiment of the present invention.
Figure 15:
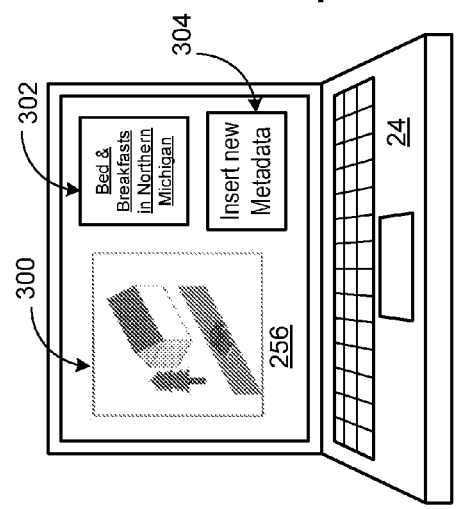
FIG. 15 presents a block diagram representation of a screen display of a personal computer 24 in accordance with an embodiment of the present invention.
Figure 16:
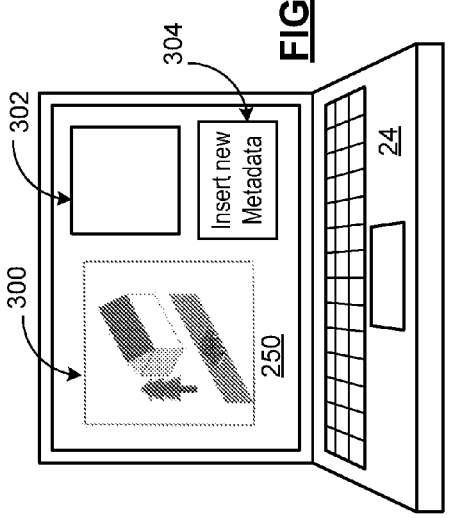
FIG. 16 presents a block diagram representation of a screen display of a personal computer 24 in accordance with an embodiment of the present invention.
Figure 17:
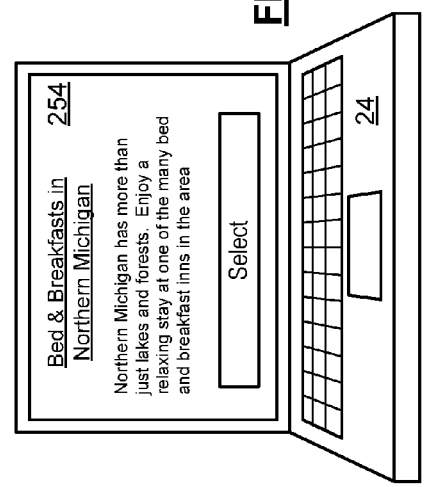
FIG. 17 presents a block diagram representation of a screen display of a personal computer 24 in accordance with an embodiment of the present invention.

FIG. 13 presents a block diagram representation of a metadata processing device 125 in accordance with another embodiment of the present invention. In particular, an alternative implementation of metadata processing device 125 is presented that includes a metadata authoring device that generates time-coded metadata 207 in response to content recognition data and in accordance with at least one time stamp of a video signal 110. The metadata 207 can be in the same form or format of the metadata 205. In this embodiment however, instead of the metadata processing device operating automatically to identify metadata to be combined with the video signal 110, the metadata processing device operates on user control via user input data 212 to specifically select metadata from one or more metadata sources and to associate the data to particular segments of the video signal 110 in a time-coded fashion.

This implementation of metadata processing device is applicable to service providers, video distribution providers or others that operate in the network or in the cloud to manually select metadata 207 for association with particular segments or portions of video signal 110. For example, this provides a tool for advertisers to identify and insert ads as metadata 207 in processed video signal 112 sent to users. This solution also works for personal clouds in the home where a user want to manually create a custom viewing experience or insert metadata that includes personal text data, image data, video data or audio data that is not publicly available or is otherwise not meant for public dissemination. For example, family vacation pictures in New Zealand could be added to a viewing a motion picture set in this country. Processed video signal 112 can be stored on a digital video recorder or other storage medium and the time-coded metadata 207 could be presented in conjunction with a viewing of the film either on the same device or on a different display device to enhance the viewing of the film for the user and the user's guests.

In an embodiment of the present invention, the metadata authoring device 210 includes a graphical user interface that allows the user to enter user input data in the form of keywords that are used by the metadata authoring device 210 to search, either the Internet or locally stored files of the user, for the time-coded metadata 207 to be embedded in the processed video signal 112, based on these keywords.

In addition, the metadata authoring device 210 can allow the user to generate the time-coded metadata 207, based on based on text included in the user input data. In this fashion the user can directly enter comments or other text to be embedded as metadata 207. As before, the metadata association device 206 generates the processed video signal 112 by combining the time-coded metadata 207 with the original or transcoded video signal 110 at time-coded locations in accordance with time stamps in the video signal 110. In this fashion, the authored metadata can be presented in a fashion that is synchronized with the display of the original video content.

FIGS. 14-17 present a block diagram representations of screen displays of a personal computer 24 in accordance with an embodiment of the present invention. In this embodiment, the metadata processing device 125 is implemented via person computer 24. In particular, personal computer 24 operates to review a video signal, and provides a graphical user interface to identify, select or enter metadata to be embedded in processed video signal that includes the original or transcoded video. Display screen 250 shows a video review area 300 for reviewing a video signal 110 and a metadata review area 302 for reviewing metadata that has previously been embedded. In the example shown, metadata review area is blank area since no metadata has been embedded in conjunction with this particular portion of the video signal 110.

An activator 304 is presented, that can be selected in response to user input. In response to the selection of the activator 304, new metadata can be inserted. In an embodiment of the present invention, in response to the user selection of the activator 304, the metadata authoring device of PC 22 automatically selects a closest time stamp in video signal 110 for use in time-coding the metadata the is selected for inclusion, based on the portion of the video signal being displayed at the time the activator 304 was selected. In addition, the display screen 252 is presented in response to the selection of the activator 304. Display screen 252 allows the user to search for new metadata to be associated with the portion of the video signal being displayed.

As shown the user is given the option of browsing local files, searching local files based on a keyword search or other directed search, performing an Internet search, etc. Screen display 254 presents an example of such metadata that has been located by the user after search or browsing of either local or Internet content. The user is given the option to select that content for embedding as time coded meta-data. Display screen 256 presents the same portion of the video after the content from display screen 254 has been selected as metadata to be embedded in conjunction with the portion of the vide displayed. As shown, the metadata review area 302 is now populated with the selected metadata.

Figure 18:
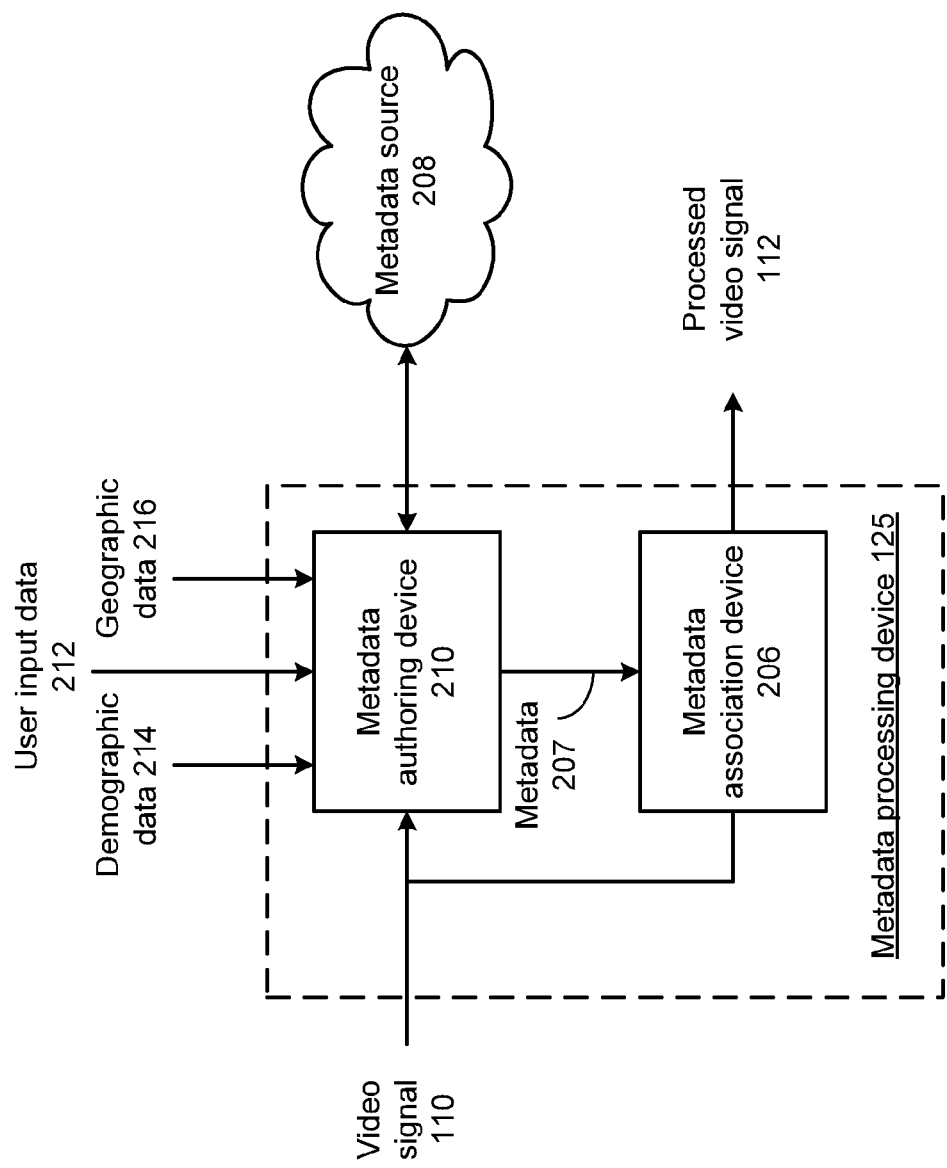
FIG. 18 presents a block diagram representation of a metadata processing device 125 in accordance with another embodiment of the present invention.
Figure 19:
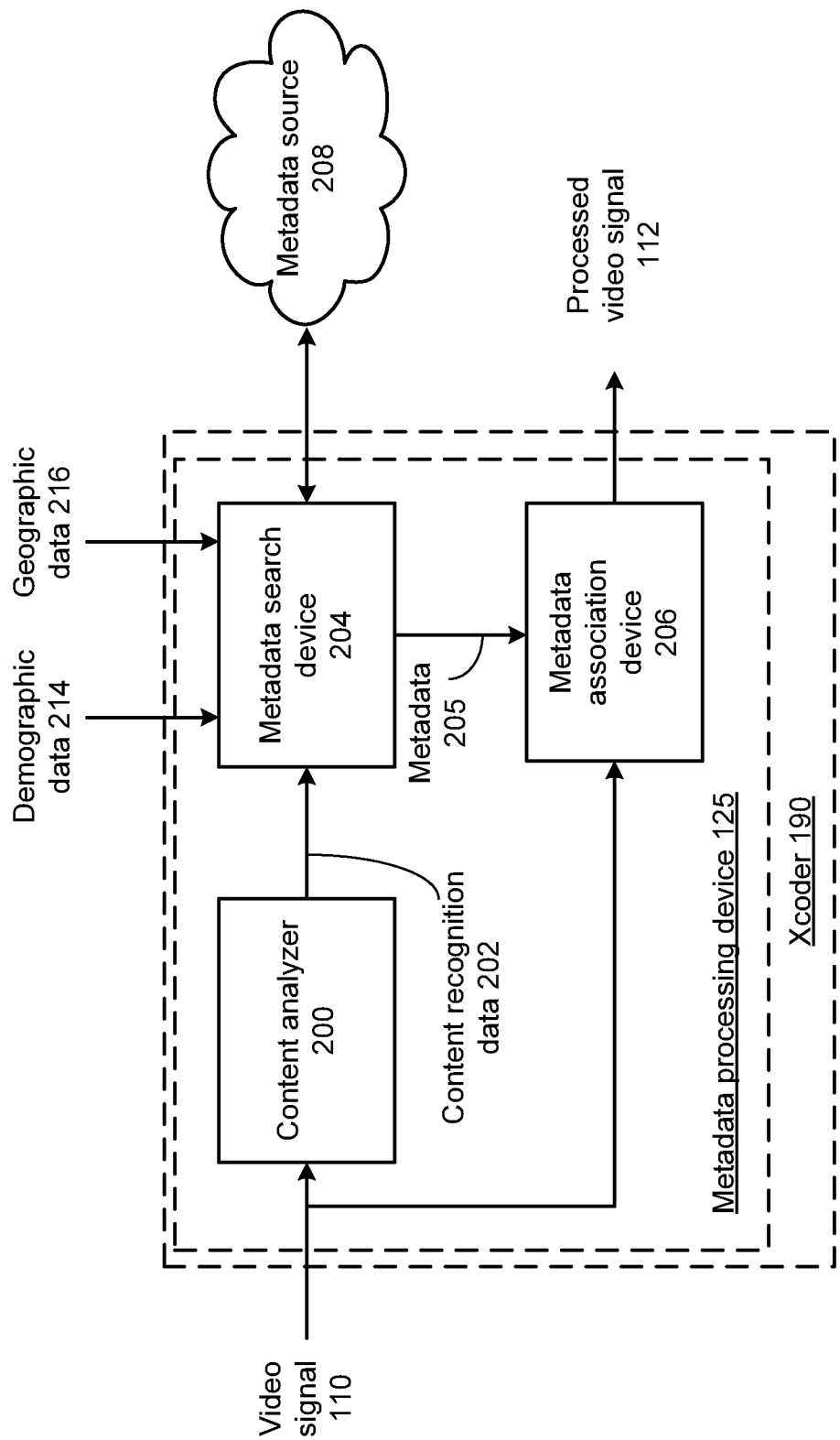
FIG. 19 presents a block diagram representation of a metadata processing device 125 in accordance with another embodiment of the present invention.

FIGS. 18-19 present block diagram representations of a metadata processing device 125 in accordance with other embodiments of the present invention. These alternative configurations operate in a similar fashion to the metadata processing devices 125 described in conjunction with FIG. 2 and FIG. 13. A plurality of metadata 205 or 207 are embedded in processed video signal 122 in accordance with selection options associated with particular selection data such as demographic data 212, geographic data 214 or other selection criteria, such as the formats compatible with various devices including different aspect ratios and device resolutions, metadata formats, or other selection criteria. The metadata 205 or 207 is not only time-coded in accordance with at least one time stamp of the video signal it is further associated with one or more forms of selection data so that a decoder can automatically select portions of the metadata for display, based on selection data present at the decoder.

In one example, video signal 110 corresponds to a live sporting event and metadata 205 or 207 is generated that corresponds to an alternative audio track with a different play-by-play of the sporting event associated with different viewer demographics or different geographical regions. In this fashion, broadcasters can transmit the live sporting event but have the play-by-play customized at the user's receiving device. For example, viewers in Boston or Los Angeles of a Boston Celtics, Los Angeles Lakers game can each hear a local play-by-play of the game. Similarly, alternative game play-by-plays can be directed to users with differing demographics.

In addition, advertisers could regionalize national ads—e.g. a car company could produce a national ad, but leave a blank space where a local overlay can be inserted that refers to the nearest dealer, this mechanism could pick up the local ad on the fly while data is passing through or being transcoded and insert the content served by a nearby private database). The metadata processing device 125, in this example, can insert advertising overlays that are sensitive to, time, content, user profiles, location, etc. This allows more accurate, efficient and profitable advertising delivery by, for example squeezing the picture during late night PSA's or simple programming and use the blank space on the screen to overlay auctioned ads based on the known local and previously inserted metadata or insert advertising or logos in the blank bars when letterbox or pillar box video is being displayed.

Figure 20:
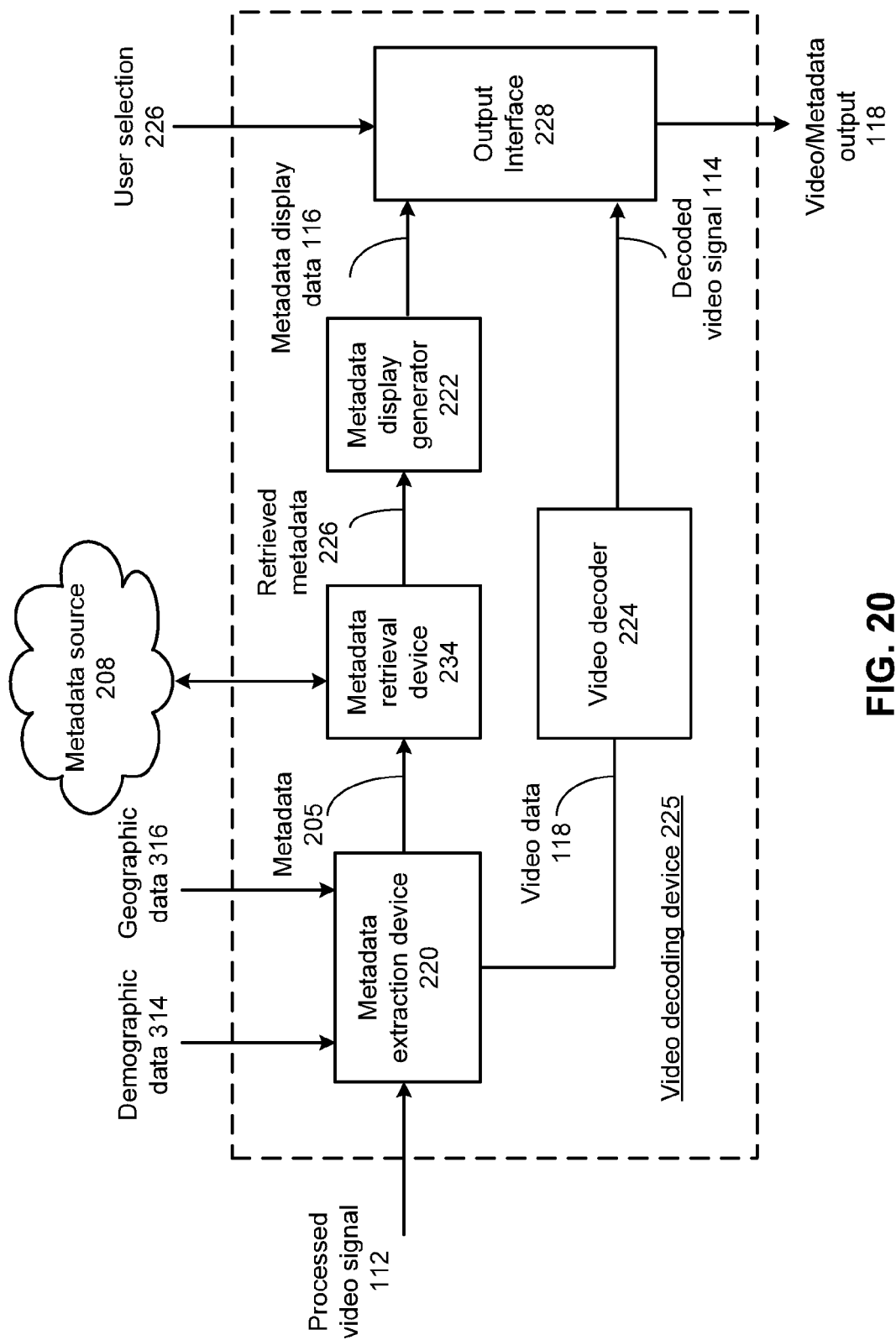
FIG. 20 presents a block diagram representation of a video decoding device 225 in accordance with an embodiment of the present invention.

FIG. 20 presents a block diagram representation of a video decoding device 225 in accordance with an embodiment of the present invention. In particular, a video decoding device is presented that includes common elements previously described, for example, in conjunction with FIGS. 5-6. In this embodiment however, metadata extraction device 220 generates metadata 205 to include only a selected portion of the metadata that was embodied in the processed video 112. In particular, metadata extraction device selects metadata for generation as metadata 205 based on the selection data, such as demographic data 314, geographic data 316 and/or other selection data. In this fashion, the video decoding device 225 and/or a video receiving device 230 that it is coupled to can generate and/or store demographic data 314 based on the input of user preferences, defaults and/or the conduct of the user in making purchases, selecting videos for download, etc. In addition, the video decoding device 225 and/or a video receiving device 230 that it is coupled to can generate and/or store geographic data 314 based on the input of user preferences, defaults and/or based on a global positioning system (GPS) device included in video decoding device 225 and/or a video receiving device 230 or other location data. Metadata that is received and associated with certain selection criteria such as user demographics, location information or other selection criteria is retrieved and/or used to generate metadata display data 116 only if the local selection data matches the selection criteria that is included in the metadata received via processed video signal 112.

As discussed in conjunction with FIGS. 18-19, the metadata received via processed video signal 112 can include a plurality of advertisements and metadata extraction device 220 can generate metadata 205 as only a selected portion of the metadata—i.e. to include only selected advertisements, based on the selection data at the video decoding device 225. In another example, the metadata received in processed video signal 112 includes at least one alternative audio track that is selected and used for output in conjunction with the video/metadata output 118 only when the selection criteria presented in conjunction with this metadata matches the local selection data at the video decoding device 225.

FIG. 21 presents a block diagram representation of a video distribution system 375 in accordance with an embodiment of the present invention. In particular, processed video signal 112 is transmitted via a transmission path 122 to a video receiving device 10. The video receiving device 10 includes a video decoding device 225 to decode the processed video signal 112 for display of the video portion on video display device 12 and the metadata portion of personal computer 14. In an embodiment of the present invention, video receiving device can be implemented via a set-top box, digital video recorder, router or home gateway.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus (USB) protocol, an Ethernet protocol, Media over Coax Alliance (MoCA) protocol or other high speed protocol.

FIGS. 22-23 present pictorial diagram representations of various video devices in accordance with embodiments of the present invention. In particular, television or monitor 322 and portable computer 320 illustrate other electronic devices that incorporate a video decoding device 225 in accordance with one or more features or functions of the present invention. While these particular devices are illustrated, the present invention can be implemented in any device that is capable of decoding and/or transcoding video content in accordance with the methods and systems described in conjunction with FIGS. 1-30 and the appended claims.

Figure 24:
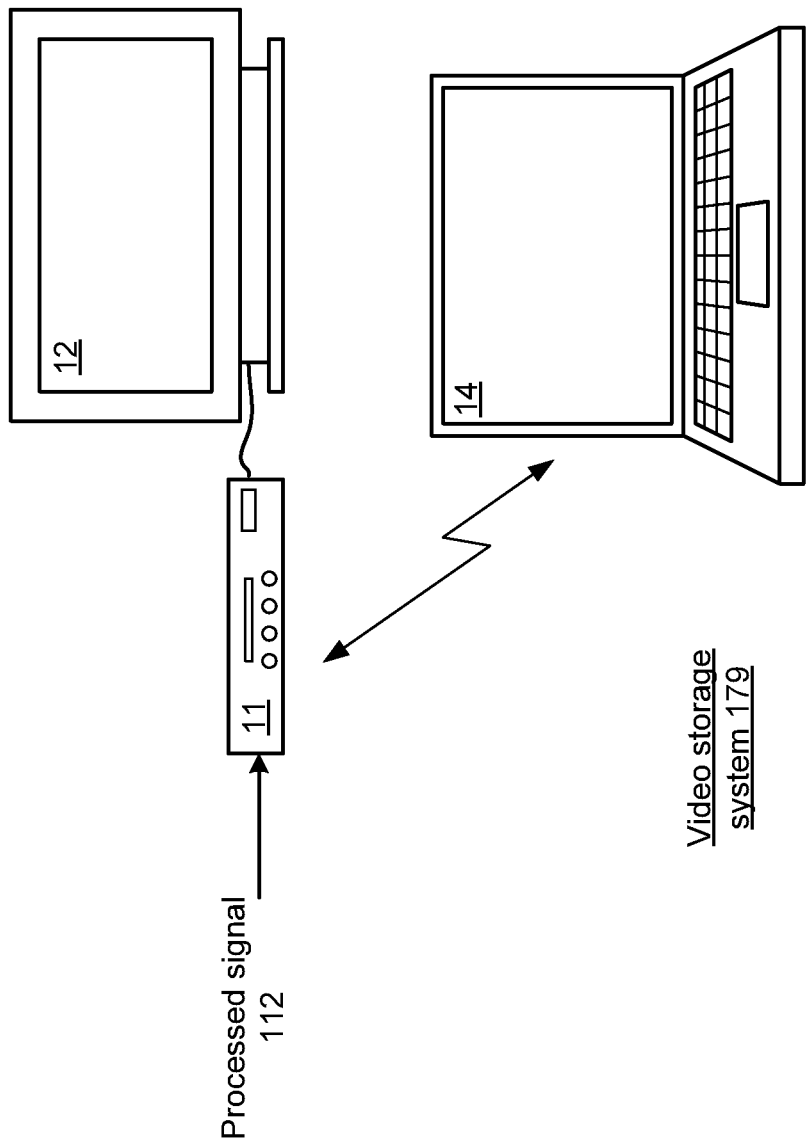
FIG. 24 presents a block diagram representation of a video storage system 179 in accordance with an embodiment of the present invention.

FIG. 24 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112. In this configuration, device 11 can include video decoding device 125 that operates to decode the video signal 112 and extract the metadata when retrieved from storage to generate a video signal a format that is suitable for display by video display device 12 and further to send metadata display data for display on another display device such as personal computer 14. While particular devices are illustrated, video storage system 179 can include a hard drive, flash memory device, computer, DVD burner, or any other device that is capable of generating, storing, decoding, transcoding and/or displaying the video content of processed video signal 112 in accordance with the methods and systems described in conjunction with the features and functions of the present invention as described herein.

Figure 25:
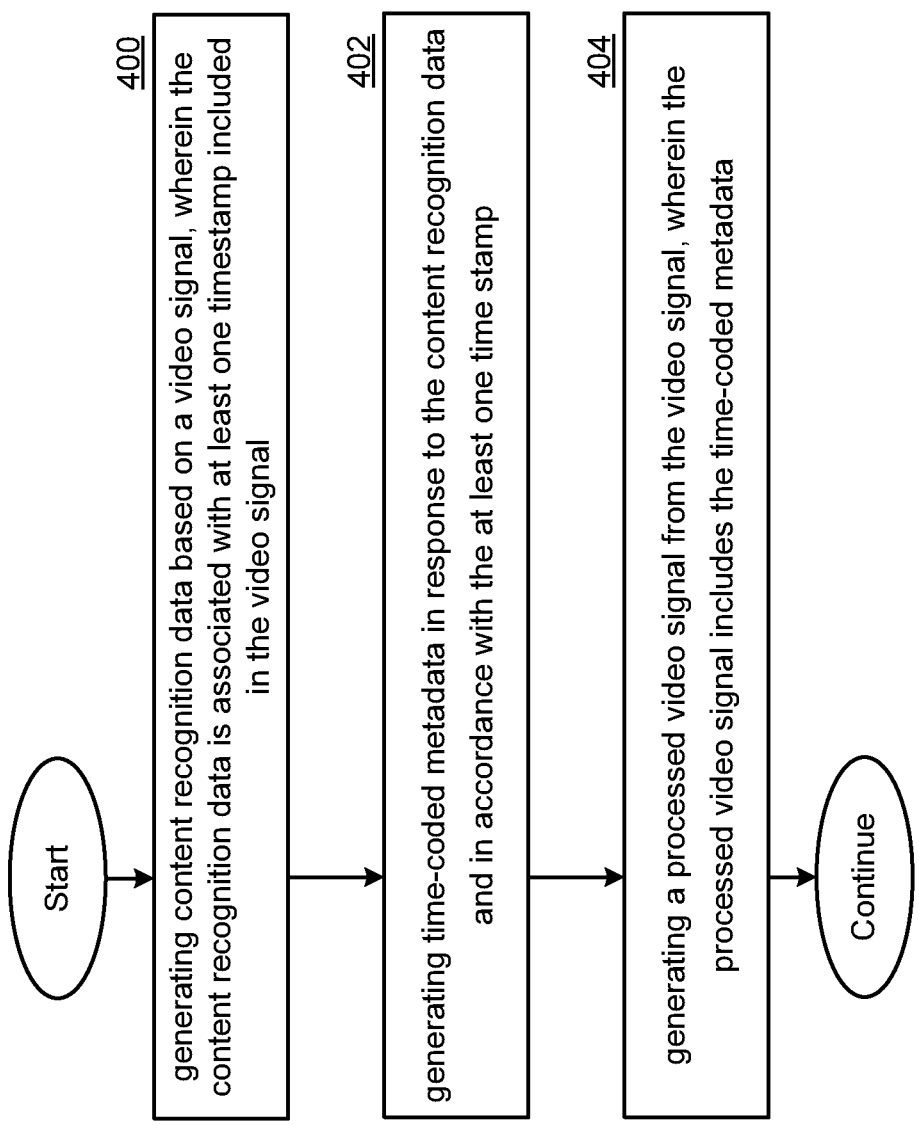
FIG. 25 presents a flow diagram representation of a method in accordance with an embodiment of the present invention.

FIG. 25 presents a flow diagram representation of a method in accordance with an embodiment of the present invention. In particular, a method is presented for use in conjunction with one or more functions and features described in conjunction with FIGS. 1-24. In step 400, content recognition data is generated based on a video signal, wherein the content recognition data is associated with at least one timestamp included in the video signal. In step 402, time-coded metadata is generated in response to the content recognition data and in accordance with the at least one time stamp. In step 404, a processed video signal is generated from the video signal, wherein the processed video signal includes the time-coded metadata.

In an embodiment of the present invention, speech recognition is used to generate the content recognition data based on the recognition of speech in audio information included in the video signal. Image recognition can also used to generate the content recognition data based on the recognition of image data included in the video signal.

The time-coded metadata can include a link to media that includes at least one of: text data, audio data, video data, and image data. The time-coded metadata can directly include at least one of: text data, audio data, video data, and image data. The content recognition data can includes at least one keyword and the metadata search device can search for the time-coded metadata based on the at least one keyword. Step 402 can include generating a plurality of search results and associated relevance data and selecting the time-coded metadata by comparing the associated relevance data based on a relevance threshold.

The processed video signal can be generated by combining the time-coded metadata with the video signal at time-coded locations in accordance with the at least one time stamp. The processed video signal can be generated by embedding the time-coded metadata as a watermark on the video signal.

Figure 26:
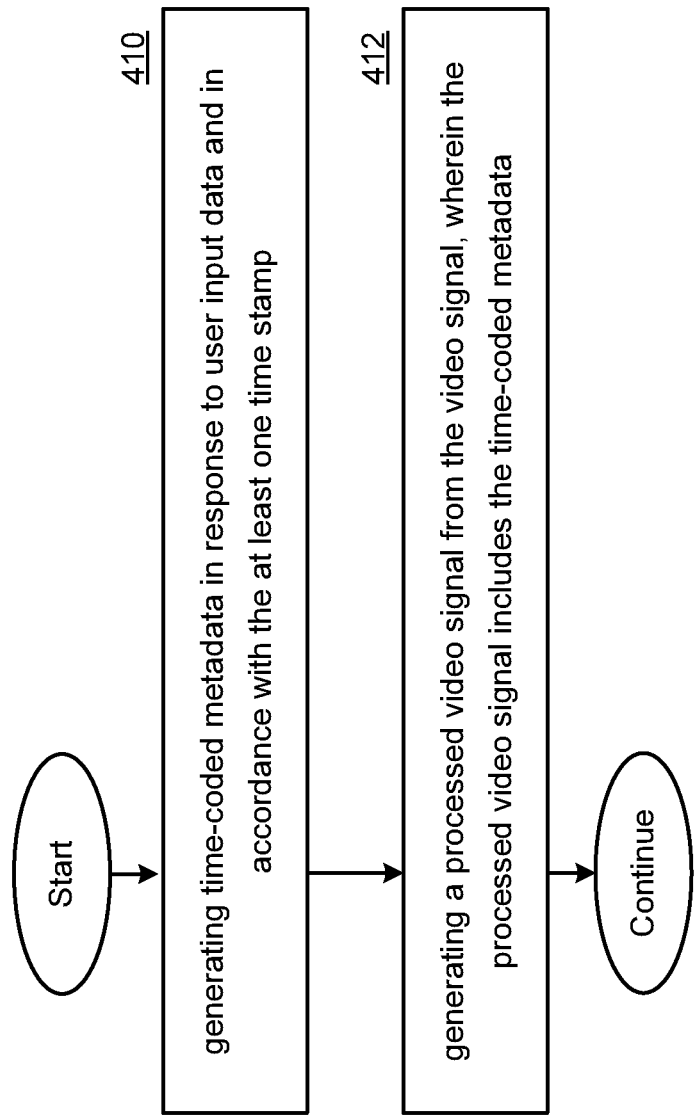
FIG. 26 presents a flow diagram representation of a method in accordance with an embodiment of the present invention.

FIG. 26 presents a flow diagram representation of a method in accordance with an embodiment of the present invention. In particular, a method is presented for use in conjunction with one or more functions and features described in conjunction with FIGS. 1-25. In step 410, time-coded metadata is generated in response to user input data and in accordance with the at least one time stamp of a video signal. In step 412, a processed video signal is generated from the video signal, wherein the processed video signal includes the time-coded metadata.

The time-coded metadata can be generated via a graphical user interface. The time-coded metadata can include a link to media that includes at least one of: text data, audio data, video data, and image data. The time-coded metadata can directly include at least one of: text data, audio data, video data, and image data. The user input data can includes at least one keyword and a metadata authoring device can search for the time-coded metadata based on the at least one keyword. Step 410 can include searching at least one of: locally stored files and Internet search results.

The time-coded metadata can be generated based on text included in the user input data. The processed video signal can be generated by combining the time-coded metadata with the video signal at time-coded locations in accordance with the at least one time stamp. In addition, the processed video signal can be generated by embedding the time-coded metadata as a watermark on the video signal.

Figure 27:
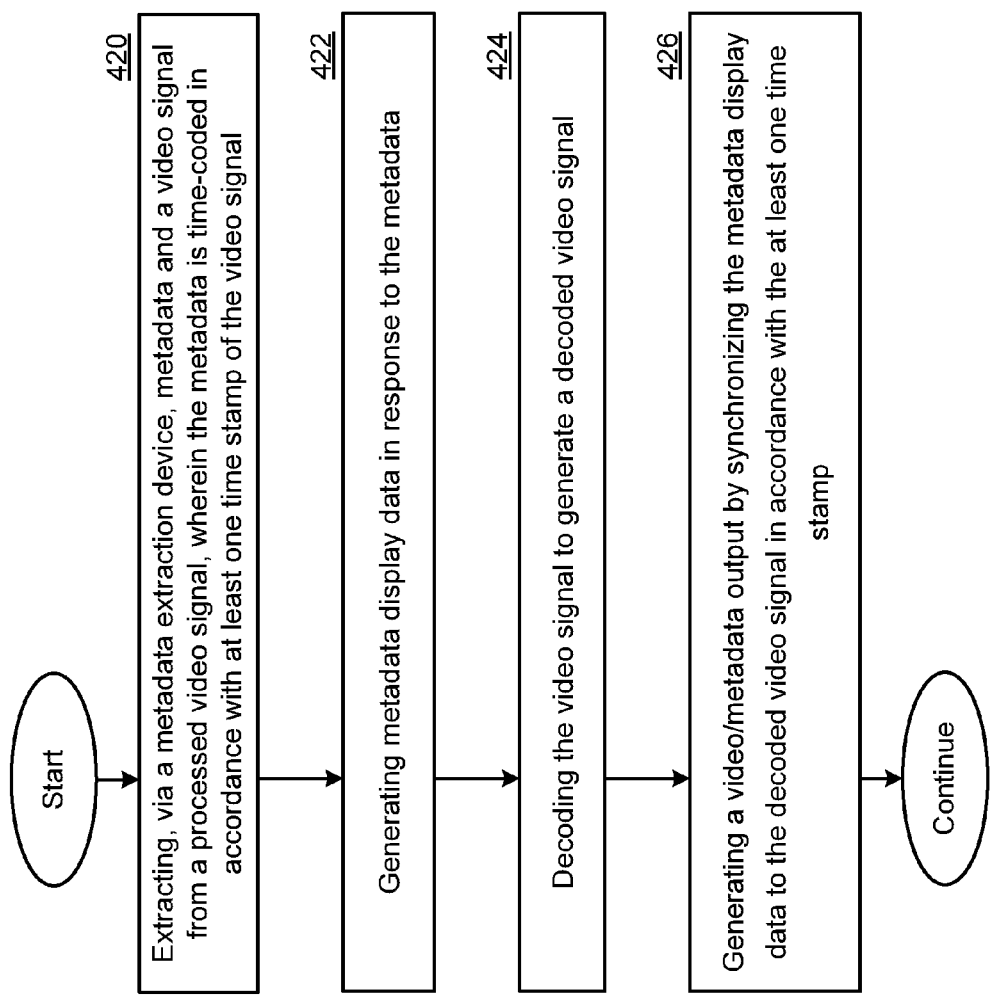
FIG. 27 presents a flow diagram representation of a method in accordance with an embodiment of the present invention.

FIG. 27 presents a flow diagram representation of a method in accordance with an embodiment of the present invention. In particular, a method is presented for use in conjunction with one or more functions and features described in conjunction with FIGS. 1-26. In step 420 begins by extracting, via a metadata extraction device, metadata and a video signal from a processed video signal, wherein the metadata is time-coded in accordance with at least one time stamp of the video signal. In step 422, metadata display data is generated in response to the metadata. In step 424, the video signal is decoded to generate a decoded video signal. In step 426, a video/metadata output is generated by synchronizing the metadata display data to the decoded video signal in accordance with the at least one time stamp.

Step 426 can include responding to a first user selection to combine the metadata display data and the decoded video signal for display of the video/metadata output on a first video display device. Step 426 can include responding to a second user selection to generate first video/metadata output that includes the decoded video signal for display on the first video display device and second video/metadata output that includes the metadata display data for display on a second display device. The video/metadata output can include a selected portion of the metadata display data, based on a user selection.

The time-coded metadata can include a link to media that includes at least one of: text data, audio data, video data, and image data. The time-coded metadata can directly include at least one of: text data, audio data, video data, and image data. The processed video signal can be generated by embedding the time-coded metadata as a watermark on the video signal.

Figure 28:
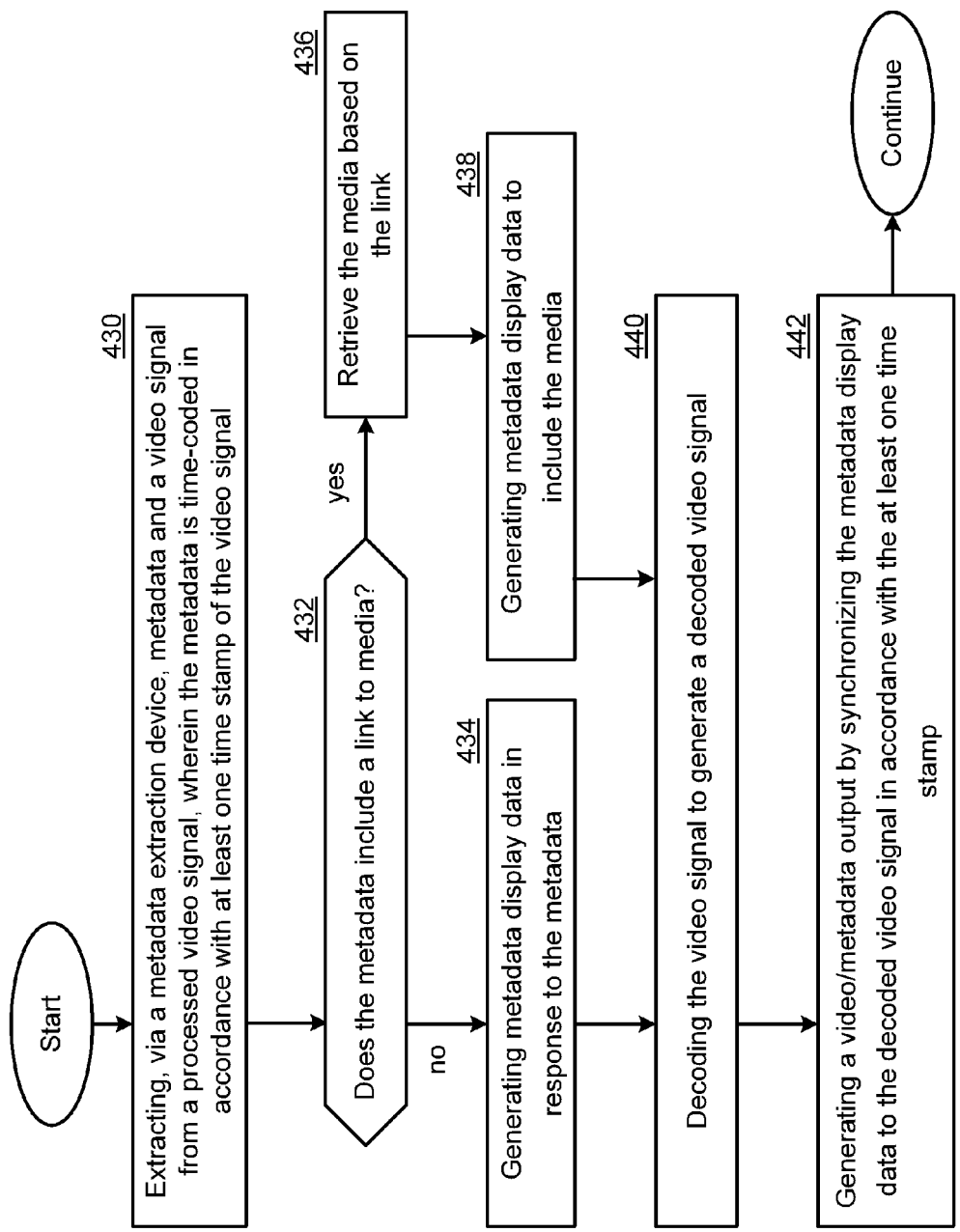
FIG. 28 presents a flow diagram representation of a method in accordance with an embodiment of the present invention.

FIG. 28 presents a flow diagram representation of a method in accordance with an embodiment of the present invention. In particular, a method is presented for use in conjunction with one or more functions and features described in conjunction with FIGS. 1-27. In step 430 begins by extracting, via a metadata extraction device, metadata and a video signal from a processed video signal, wherein the metadata is time-coded in accordance with at least one time stamp of the video signal. In step 432 the method determines if the metadata includes a link to media. If so, the method proceeds to steps 436 and 438 where the metadata is retrieved based on the link at metadata display data is generated to include the media. Otherwise, in step 434, metadata display data is generated in response to the metadata. In step 440, the video signal is decoded to generate a decoded video signal. In step 442, a video/metadata output is generated by synchronizing the metadata display data to the decoded video signal in accordance with the at least one time stamp.

Figure 29:
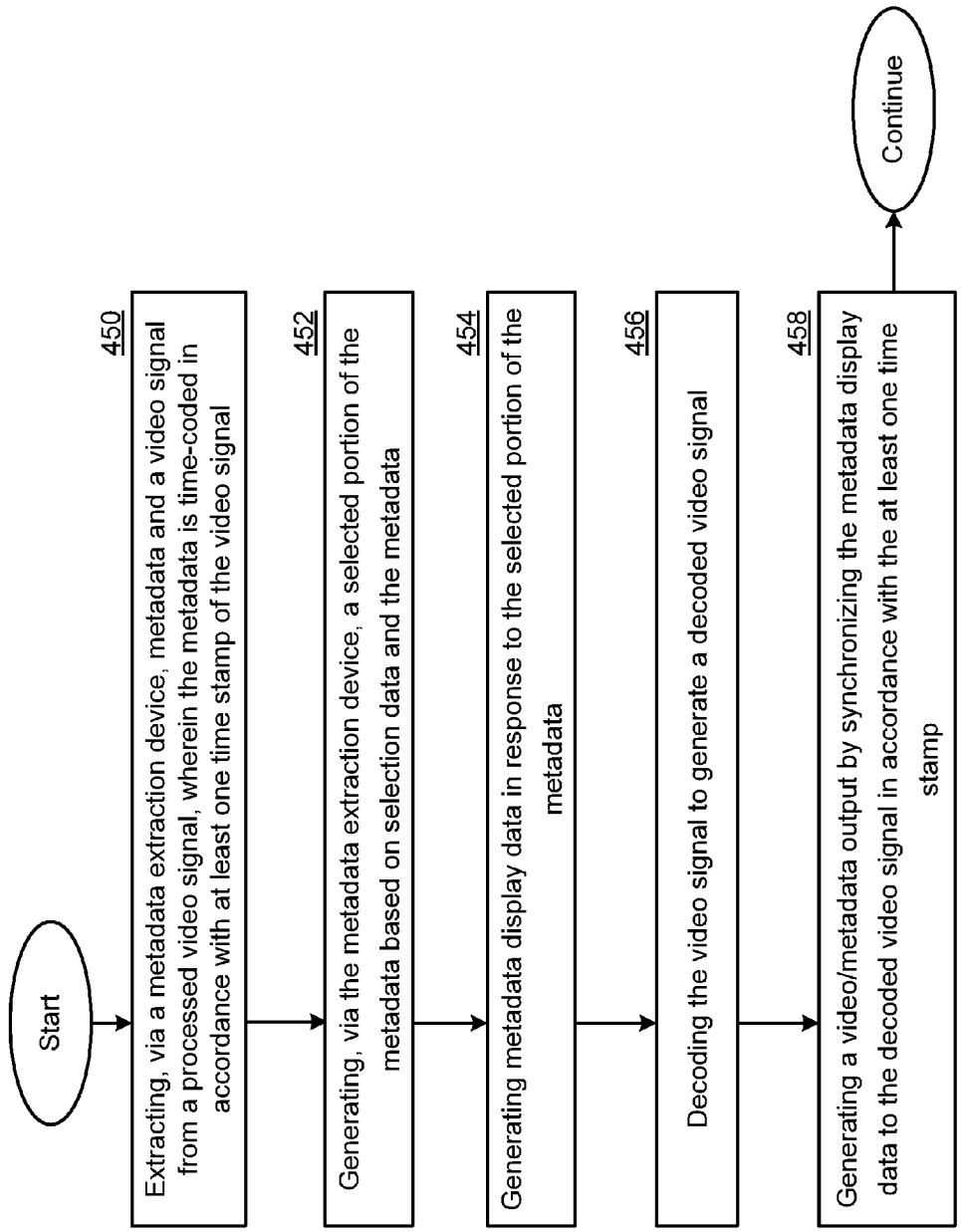
FIG. 29 presents a block diagram representation of a screen display of a video display device 20 in accordance with an embodiment of the present invention.

FIG. 29 presents a flow diagram representation of a method in accordance with an embodiment of the present invention. In particular, a method is presented for use in conjunction with one or more functions and features described in conjunction with FIGS. 1-21. Step 450 begins by extracting, via a metadata extraction device, metadata and a video signal from a processed video signal, wherein the metadata is time-coded in accordance with at least one time stamp of the video signal. Step 452 includes generating, via the metadata extraction device, a selected portion of the metadata based on selection data and the metadata. In step 454, metadata display data is generated in response to the selected portion of the metadata. In step 456, the video signal is decoded to generate a decoded video signal. In step 458, a video/metadata output is generated by synchronizing the metadata display data to the decoded video signal in accordance with the at least one time stamp.

The selection data can includes demographic data of a user and/or geographic data corresponding to a location of the user. The metadata can include a plurality of advertisements and the selected portion of the metadata can include at least one selected advertisement of the plurality of advertisements. The metadata can include at least one alternative audio track corresponding to the video signal.

The time-coded metadata can include a link to media that includes at least one of: text data, audio data, video data, and image data. The time-coded metadata can directly include at least one of: text data, audio data, video data, and image data. The processed video signal can be generated by embedding the time-coded metadata as a watermark on the video signal.

FIG. 30 presents a flow diagram representation of a method in accordance with an embodiment of the present invention. In particular, a method is presented for use in conjunction with one or more functions and features described in conjunction with FIGS. 1-29. Step 460 begins by extracting, via a metadata extraction device, metadata and a video signal from a processed video signal, wherein the metadata is time-coded in accordance with at least one time stamp of the video signal. Step 462 includes generating, via the metadata extraction device, a selected portion of the metadata based on selection data and the metadata. In step 464, the method determines if the selected portion of metadata includes a link to media. If so, the method proceeds to steps 4466 and 468 where the media is retrieved based on the link and the metadata display data is generated to include the media. Otherwise, in step 470, metadata display data is generated in response to the selected portion of the metadata. In step 472, the video signal is decoded to generate a decoded video signal. In step 474, a video/metadata output is generated by synchronizing the metadata display data to the decoded video signal in accordance with the at least one time stamp.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, such as via a processing device and/or memory, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing various video processing devices. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video processing device comprising:
   a content analyzer that receives a video signal and generates content recognition data based on the video signal, wherein the content recognition data is associated with at least one timestamp included in the video signal and wherein the content recognition data includes at least one keyword generated by recognizing video content in the video signal as corresponding to the at least one keyword;
   a metadata search device, coupled to the content analyzer and at least one external source, that searches for information in response to the content recognition data and generates time-coded metadata in accordance with the at least one time stamp, the content recognition data and that includes the information, wherein the metadata search device searches the at least one external source, based on the at least one keyword, to identify the information; and
   a metadata association device, coupled to the metadata search device, that generates a processed video signal from the video signal, wherein the processed video signal includes the time-coded metadata.

2. The video processing device of claim 1 wherein the content analyzer uses speech recognition to generate the content recognition data based on a recognition of speech in audio information included in the video signal.

3. The video processing device of claim 1 wherein the content analyzer uses image recognition to generate the content recognition data based on a recognition of image data included in the video signal.

4. The video processing device of claim 1 wherein the time-coded metadata includes a universal resource locator link to media that includes at least one of: text data, audio data, video data, and image data.

5. The video processing device of claim 1 wherein the time-coded metadata includes at least one of: text data, audio data, video data, and image data.

6. The video processing device of claim 1 wherein the metadata search device generates the information as a plurality of search results and associated relevance data and selects the time-coded metadata by comparing the associated relevance data based on a relevance threshold.

7. The video processing device of claim 1 wherein the metadata association device generates the processed video signal by combining the time-coded metadata with the video signal at time-coded locations in accordance with the at least one time stamp.

8. The video processing device of claim 1 wherein the metadata association device generates the processed video signal by embedding the time-coded metadata as a watermark on the video signal.

9. A method comprising:

generating content recognition data based on a video signal, wherein the content recognition data is associated with at least one timestamp included in the video signal and wherein the content recognition data includes at least one keyword generated by recognizing video content in the video signal as corresponding to the at least one keyword;

searching for information from at least one information source in response to the content recognition data based on the at least one keyword, and generating time-coded metadata in accordance with the at least one time stamp, the content recognition data and that includes the information; and generating a processed video signal from the video signal, wherein the processed video signal includes the time-coded metadata.

10. The method of claim 9 wherein speech recognition is used to generate the content recognition data based on a recognition of speech in audio information included in the video signal.

11. The method of claim 9 wherein image recognition is used to generate the content recognition data based on a recognition of image data included in the video signal.

12. The method of claim 9 wherein the time-coded metadata includes a universal resource locator link to media that includes at least one of: text data, audio data, video data, and image data.

13. The method of claim 9 wherein the time-coded metadata includes at least one of: text data, audio data, video data, and image data.

14. The method of claim 9 wherein the information includes a plurality of search results and associated relevance data and generating the time-coded metadata includes selecting the time-coded metadata by comparing the associated relevance data based on a relevance threshold.

15. The method of claim 9 wherein the processed video signal is generated by combining the time-coded metadata with the video signal at time-coded locations in accordance with the at least one time stamp.

16. The method of claim 9 wherein the processed video signal is generated by embedding the time-coded metadata as a watermark on the video signal.

* * * * *